US009894505B2

(12) United States Patent
Kearney, III et al.

(10) Patent No.: US 9,894,505 B2
(45) Date of Patent: *Feb. 13, 2018

(54) NETWORKED MEDIA STATION

(71) Applicant: Apple Inc., Cupertino, CA (US)

(72) Inventors: Philip F. Kearney, III, Cupertino, CA (US); Robert Dale Newberry, Jr., San Jose, CA (US); Jeffrey L. Robbin, Los Altos, CA (US); David Heller, San Jose, CA (US); Christopher R. Wysocki, Los Gatos, CA (US); Stephen Anderson Davis, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/313,630

(22) Filed: Jun. 24, 2014

(65) Prior Publication Data

US 2014/0307585 A1 Oct. 16, 2014

Related U.S. Application Data

(63) Continuation of application No. 10/862,115, filed on Jun. 4, 2004, now Pat. No. 8,797,926.

(51) Int. Cl.
H04W 8/24 (2009.01)
H04W 84/12 (2009.01)
(Continued)

(52) U.S. Cl.
CPC ............ *H04W 8/005* (2013.01); *H04L 12/66* (2013.01); *H04L 49/604* (2013.01);
(Continued)

(58) Field of Classification Search
CPC .................. H04L 12/2803–12/2814; H04L 12/283–12/2838; H04L 2012/284;
(Continued)

(56) References Cited

U.S. PATENT DOCUMENTS 4,807,224 A 12/1989 Naron et al.
5,534,911 A 7/1996 Levitan
(Continued)

FOREIGN PATENT DOCUMENTS

EP 0146334 A2 6/1985
EP 0830026 3/1998
(Continued)

OTHER PUBLICATIONS

Linksys: "New Linksys Wireless Home Products Showcased at CEBIT 2004" Internet Article, dated Mar. 18, 2004, Retrieved from Internet: www.broadbandbuyer.co.uk/Shop/pageTextDetail.asp?SetID=2&TextID=473.

(Continued)

Primary Examiner — Timothy J Weidner
(74) Attorney, Agent, or Firm — Fletcher Yoder PC

(57) ABSTRACT

Disclosed herein is a networked media station providing a variety of features including a wireless network interface, a wired network interface, a peripheral interface, and a multimedia interface. The wireless network interface(s) allows the device to communicate to serve as a wireless base station or repeater and/or a bridge between a wireless and a wired network. The peripheral interface allows the device to communicate with a variety of peripherals, and, in conjunction with the network interface(s), allows sharing of a peripheral among multiple networked computers. The multimedia interface allows the device to be used with entertainment devices for streaming of multimedia information from a network connected computer to the entertainment device. Control of various aspects of the device is preferably controlled from a network connected computer.

28 Claims, 7 Drawing Sheets

(51) Int. Cl.
| | |
|---|---|
| *H04W 88/04* | (2009.01) |
| *H04W 88/18* | (2009.01) |
| *H04W 8/00* | (2009.01) |
| *H04L 12/66* | (2006.01) |
| *H04L 12/931* | (2013.01) |
| *H04L 29/06* | (2006.01) |
| *H04W 12/06* | (2009.01) |
| *H04W 84/10* | (2009.01) |

(52) U.S. Cl.
CPC ........ *H04L 65/4092* (2013.01); *H04L 65/605* (2013.01); *H04W 12/06* (2013.01); *H04W 84/105* (2013.01); *H04W 88/04* (2013.01)

(58) Field of Classification Search
CPC ............. H04L 2012/2849; H04L 12/66; H04L 29/06476–29/06517; H04L 49/604; H04L 65/4092–65/608; H04L 67/2823; H04N 19/40; H04W 8/005; H04W 12/06; H04W 84/105; H04W 88/181
See application file for complete search history.

(56) References Cited

U.S. PATENT DOCUMENTS

| | | | |
|---|---|---|---|
| 5,535,381 A | 7/1996 | Kopper | |
| 5,553,222 A | 9/1996 | Milne et al. | |
| 5,559,945 A | 9/1996 | Beaudet et al. | |
| 5,583,993 A | 12/1996 | Foster et al. | |
| 5,587,404 A | 12/1996 | Kroner et al. | |
| 5,613,863 A | 3/1997 | Klaus | |
| 5,616,876 A | 4/1997 | Cluts | |
| 5,640,566 A | 6/1997 | Victor et al. | |
| 5,664,044 A | 9/1997 | Ware | |
| 5,664,226 A | 9/1997 | Czako et al. | |
| 5,666,530 A | 9/1997 | Clark et al. | |
| 5,696,948 A | 12/1997 | Cruz | |
| 5,710,922 A | 1/1998 | Alley et al. | |
| 5,721,949 A | 2/1998 | Smith et al. | |
| 5,722,041 A | 2/1998 | Freadman | |
| 5,727,202 A | 3/1998 | Kucala | |
| 5,739,451 A | 4/1998 | Winksy et al. | |
| 5,745,583 A | 4/1998 | Koizumi et al. | |
| 5,751,997 A | 5/1998 | Kullick et al. | |
| 5,790,521 A | 8/1998 | Lee et al. | |
| 5,815,297 A | 9/1998 | Ciciora | |
| 5,835,721 A | 11/1998 | Donahue et al. | |
| 5,835,732 A | 11/1998 | Kikinis et al. | |
| 5,845,282 A | 12/1998 | Alley et al. | |
| 5,864,868 A | 1/1999 | Contois | |
| 5,867,668 A | 2/1999 | Spirakis et al. | |
| 5,875,354 A | 2/1999 | Charlton et al. | |
| 5,918,213 A | 6/1999 | Bernard et al. | |
| 5,918,303 A | 6/1999 | Yamaura et al. | |
| 5,923,757 A | 7/1999 | Hocker et al. | |
| 5,925,843 A | 7/1999 | Miller et al. | |
| 5,931,906 A | 8/1999 | Fidelibus et al. | |
| 5,953,350 A | 9/1999 | Higgins | |
| 5,963,916 A | 10/1999 | Kaplan | |
| 5,969,283 A | 10/1999 | Looney et al. | |
| 6,000,000 A | 12/1999 | Hawkins et al. | |
| 6,006,274 A | 12/1999 | Hawkins et al. | |
| 6,008,777 A | 12/1999 | Yiu | |
| 6,038,199 A | 3/2000 | Pawlowski et al. | |
| 6,041,023 A | 3/2000 | Lakhansingh | |
| 6,061,306 A | 5/2000 | Buchheim | |
| 6,085,252 A | 7/2000 | Zhu et al. | |
| 6,092,119 A | 7/2000 | Rossmere et al. | |
| 6,101,591 A | 8/2000 | Foster et al. | |
| 6,125,369 A | 9/2000 | Wu et al. | |
| 6,138,245 A | 10/2000 | Son et al. | |
| 6,166,314 A | 12/2000 | Weinstock et al. | |
| 6,172,948 B1 | 1/2001 | Keller et al. | |
| 6,208,044 B1 | 3/2001 | Viswanadham et al. | |
| 6,212,359 B1 | 4/2001 | Knox | |
| 6,216,131 B1 | 4/2001 | Liu et al. | |
| 6,243,328 B1 | 6/2001 | Fenner et al. | |
| 6,243,725 B1 | 6/2001 | Fenner et al. | |
| 6,243,772 B1 | 6/2001 | Ghori et al. | |
| 6,247,135 B1 | 6/2001 | Feague | |
| 6,248,946 B1 | 6/2001 | Dwek | |
| 6,263,313 B1 | 7/2001 | Milsted et al. | |
| 6,263,503 B1 | 7/2001 | Margulis | |
| 6,272,545 B1 | 8/2001 | Flanagin et al. | |
| 6,282,714 B1 | 8/2001 | Ghori et al. | |
| 6,283,764 B2 | 9/2001 | Kajiyama et al. | |
| 6,295,541 B1 | 9/2001 | Bodnar et al. | |
| 6,332,175 B1 | 12/2001 | Birrell et al. | |
| 6,338,044 B1 | 1/2002 | Cook et al. | |
| 6,341,316 B1 | 1/2002 | Kloba et al. | |
| 6,345,256 B1 | 2/2002 | Milsted et al. | |
| 6,356,971 B1 | 3/2002 | Katz et al. | |
| 6,374,177 B1 | 4/2002 | Lee et al. | |
| 6,380,947 B1 | 4/2002 | Stead | |
| 6,389,467 B1 | 5/2002 | Eyal | |
| 6,397,388 B1 | 5/2002 | Allen | |
| 6,411,943 B1 | 6/2002 | Crawford | |
| 6,429,880 B2 | 8/2002 | Marcos et al. | |
| 6,453,281 B1 | 9/2002 | Walters et al. | |
| 6,489,986 B1 | 12/2002 | Allen | |
| 6,490,432 B1 | 12/2002 | Wegener et al. | |
| 6,493,758 B1 | 12/2002 | McLain | |
| 6,523,124 B1 | 2/2003 | Lunsford et al. | |
| 6,529,233 B1 | 3/2003 | Allen | |
| 6,529,804 B1 | 3/2003 | Draggon et al. | |
| 6,546,428 B2 | 4/2003 | Baber et al. | |
| 6,563,769 B1 | 5/2003 | Van Der Meulen | |
| 6,587,403 B1 | 7/2003 | Keller et al. | |
| 6,587,404 B1 | 7/2003 | Keller et al. | |
| 6,587,480 B1 | 7/2003 | Sanders | |
| 6,621,768 B1 | 9/2003 | Keller et al. | |
| 6,630,963 B1 | 10/2003 | Billmaier | |
| 6,636,873 B1 | 10/2003 | Carini et al. | |
| 6,659,861 B1 | 12/2003 | Faris et al. | |
| 6,664,981 B2 | 12/2003 | Ashe et al. | |
| 6,665,803 B2 | 12/2003 | Lunsford et al. | |
| 6,684,060 B1 | 1/2004 | Curtin | |
| 6,694,200 B1 | 2/2004 | Naim | |
| 6,718,348 B1 | 4/2004 | Novak et al. | |
| 6,721,489 B1 | 4/2004 | Benyamin et al. | |
| 6,728,585 B2 | 4/2004 | Neoh | |
| 6,728,729 B1 | 4/2004 | Jawa et al. | |
| 6,731,312 B2 | 5/2004 | Robbin | |
| 6,744,738 B1 | 6/2004 | Park et al. | |
| 6,757,913 B2 | 6/2004 | Knox | |
| 6,760,721 B1 | 7/2004 | Chasen et al. | |
| 6,763,345 B1 | 7/2004 | Hempleman et al. | |
| 6,766,376 B2 | 7/2004 | Price | |
| 6,779,019 B1 | 8/2004 | Mousseau et al. | |
| 6,785,542 B1 | 8/2004 | Blight et al. | |
| 6,794,566 B2 | 9/2004 | Pachet | |
| 6,798,838 B1 | 9/2004 | Ngo | |
| 6,801,964 B1 | 10/2004 | Mahdavi | |
| 6,831,881 B2 | 12/2004 | Patil et al. | |
| 6,845,398 B1 | 1/2005 | Galensky et al. | |
| 6,874,037 B1 | 3/2005 | Abram et al. | |
| 6,898,159 B2 | 5/2005 | Kudo | |
| 6,920,179 B1 | 7/2005 | Anand et al. | |
| 6,925,595 B1 | 8/2005 | Whitledge et al. | |
| 6,928,433 B2 | 8/2005 | Goodman et al. | |
| 6,929,058 B2 | 8/2005 | Liu et al. | |
| 6,935,627 B2 | 8/2005 | Jung | |
| 6,941,324 B2 | 9/2005 | Plastina et al. | |
| 6,944,880 B1 | 9/2005 | Allen | |
| 6,947,598 B2 | 9/2005 | Yogeshwar et al. | |
| 6,956,562 B1 | 10/2005 | O'Hara et al. | |
| 6,959,288 B1 | 10/2005 | Medina et al. | |
| 6,959,562 B2 | 11/2005 | Navedo et al. | |
| 6,978,127 B1 | 12/2005 | Bulthuis et al. | |
| 6,981,259 B2 | 12/2005 | Luman et al. | |
| 6,985,966 B1 | 1/2006 | Gupta et al. | |
| 6,987,221 B2 | 1/2006 | Platt | |
| 6,993,532 B1 | 1/2006 | Platt et al. | |

(56) References Cited

U.S. PATENT DOCUMENTS

| | | |
|---|---|---|
| 6,993,722 B1 | 1/2006 | Greer et al. |
| 6,999,826 B1 | 2/2006 | Zhou et al. |
| 7,010,758 B2 | 3/2006 | Bate |
| 7,016,443 B1 | 3/2006 | Splett |
| 7,022,905 B1 | 4/2006 | Hinman et al. |
| 7,024,214 B2 | 4/2006 | Loveland |
| 7,024,491 B1 | 4/2006 | Hanmann et al. |
| 7,024,575 B2 | 4/2006 | Lienhart et al. |
| 7,034,891 B2 | 4/2006 | Joung et al. |
| 7,084,898 B1 | 4/2006 | Firestone et al. |
| 7,039,656 B1 | 5/2006 | Tsai et al. |
| 7,047,308 B2 | 5/2006 | Deshpande |
| 7,069,058 B2 | 6/2006 | Kawashima |
| 7,075,000 B2 | 7/2006 | Gang et al. |
| 7,076,204 B2 | 7/2006 | Richenstein et al. |
| 7,082,310 B2 | 7/2006 | Hirayama et al. |
| 7,082,320 B2 | 7/2006 | Kattukaran et al. |
| 7,096,271 B1 | 8/2006 | Omoigui et al. |
| 7,111,009 B1 | 9/2006 | Gupta et al. |
| 7,130,892 B2 | 10/2006 | Mukai |
| 7,136,934 B2 | 11/2006 | Carter et al. |
| 7,142,934 B2 | 11/2006 | Janik |
| 7,143,939 B2 | 12/2006 | Henzerling |
| 7,146,322 B2 | 12/2006 | Cowgill |
| 7,166,791 B2 | 1/2007 | Robbin et al. |
| 7,174,560 B1 | 2/2007 | Crinon |
| 7,184,774 B2 | 2/2007 | Robinson et al. |
| 7,185,084 B2 | 2/2007 | Sirivara et al. |
| 7,194,692 B2 | 3/2007 | Marcos et al. |
| 7,200,357 B2 | 4/2007 | Janik et al. |
| 7,228,054 B2 | 6/2007 | Cowgill |
| 7,260,714 B2 | 8/2007 | Dawson et al. |
| 7,266,713 B2 | 9/2007 | Lienhart et al. |
| 7,281,141 B2 | 10/2007 | Elkayam et al. |
| 7,283,880 B2 | 10/2007 | Dick |
| 7,289,393 B2 | 10/2007 | Keller et al. |
| 7,295,809 B2 | 11/2007 | Moore |
| 7,295,983 B2 | 11/2007 | Fujiwara et al. |
| 7,302,239 B2 | 11/2007 | Jitsuhara |
| 7,305,691 B2 | 12/2007 | Cristofalo |
| 7,312,785 B2 | 12/2007 | Tsuk et al. |
| 7,330,868 B2 | 2/2008 | Kawasaki et al. |
| 7,336,675 B2 | 2/2008 | Naik et al. |
| 7,343,553 B1 | 3/2008 | Kaye |
| 7,346,698 B2 | 3/2008 | Hannaway |
| 7,359,671 B2 | 4/2008 | Richenstein et al. |
| 7,367,701 B2 | 5/2008 | Lee |
| 7,369,532 B2 | 5/2008 | Silvester |
| 7,370,129 B2 | 5/2008 | Green et al. |
| 7,391,791 B2 | 6/2008 | Balassanian et al. |
| 7,406,294 B1 | 7/2008 | Liu |
| 7,418,472 B2 | 8/2008 | Shoemaker et al. |
| 7,418,673 B2 | 8/2008 | Oh |
| 7,424,024 B2 | 9/2008 | Chen et al. |
| 7,430,753 B2 | 9/2008 | Gray et al. |
| 7,437,158 B2 | 10/2008 | Russell |
| 7,444,388 B1 | 10/2008 | Svendsen |
| 7,447,815 B2 | 11/2008 | Weaver |
| 7,469,283 B2 | 12/2008 | Eyal et al. |
| 7,471,988 B2 | 12/2008 | Smith et al. |
| 7,474,677 B2 | 1/2009 | Trott |
| 7,477,653 B2 | 1/2009 | Smith et al. |
| 7,480,746 B2 | 1/2009 | Simon et al. |
| 7,483,538 B2 | 1/2009 | McCarthy et al. |
| 7,502,604 B2 | 3/2009 | Knox |
| 7,505,483 B2 | 3/2009 | Jeon et al. |
| 7,508,815 B2 | 3/2009 | Kryuchkov et al. |
| 7,519,681 B2 | 4/2009 | Edwards et al. |
| 7,519,686 B2 | 4/2009 | Hong et al. |
| 7,532,862 B2 | 5/2009 | Cheshire |
| 7,539,777 B1 | 5/2009 | Aitken |
| 7,542,784 B2 | 6/2009 | Passier et al. |
| 7,543,245 B2 | 6/2009 | Irimajiri |
| 7,555,291 B2 | 6/2009 | Wassingbo et al. |
| 7,561,215 B2 | 7/2009 | Kim et al. |
| 7,577,261 B2 | 8/2009 | Liu et al. |
| 7,606,570 B2 | 10/2009 | Karaoguz et al. |
| 7,617,513 B2 | 11/2009 | McCafferty et al. |
| 7,620,011 B2 | 11/2009 | Kim et al. |
| 7,627,343 B2 | 12/2009 | Fadell et al. |
| 7,634,227 B2 | 12/2009 | de Jong |
| 7,647,346 B2 | 1/2010 | Silverman et al. |
| 7,650,470 B2 | 1/2010 | Poo |
| 7,657,706 B2 | 2/2010 | Lyer et al. |
| 7,680,849 B2 | 3/2010 | Heller et al. |
| 7,689,095 B2 | 3/2010 | Sugiyama et al. |
| 7,698,297 B2 | 4/2010 | Jawa et al. |
| 7,698,723 B2 | 4/2010 | Hicks et al. |
| 7,706,901 B2 | 4/2010 | Berreth |
| 7,724,780 B2 | 5/2010 | Baird et al. |
| 7,725,912 B2 | 5/2010 | Margulis |
| 7,734,688 B2 | 6/2010 | Langdon |
| 7,765,326 B2 | 7/2010 | Robbin et al. |
| 7,769,903 B2 | 8/2010 | Robbin et al. |
| 7,797,446 B2 | 9/2010 | Heller et al. |
| 7,821,574 B2 | 10/2010 | Black |
| 7,827,259 B2 | 11/2010 | Heller et al. |
| 7,853,341 B2 | 12/2010 | McCarty et al. |
| 7,890,661 B2 | 2/2011 | Spurgat et al. |
| 7,899,915 B2 | 3/2011 | Reisman |
| 7,903,690 B2 | 3/2011 | Wakid |
| 7,950,037 B2 | 5/2011 | Mensch |
| 7,996,505 B2 | 8/2011 | Krantz et al. |
| 8,037,220 B2 | 10/2011 | Moore et al. |
| 8,169,938 B2 | 5/2012 | Duchscher et al. |
| 8,184,657 B2 | 5/2012 | Dacosta |
| 8,214,447 B2 | 7/2012 | Deslippe et al. |
| 8,266,657 B2 | 9/2012 | Margulis |
| 8,284,739 B2 | 10/2012 | Doyle et al. |
| 8,285,727 B2 | 10/2012 | Weber et al. |
| 8,374,087 B2 | 2/2013 | Dacosta |
| 8,443,038 B2 | 5/2013 | Robbin et al. |
| 8,539,533 B2 | 9/2013 | Caspi et al. |
| 8,797,926 B2 | 8/2014 | Kearney |
| 2001/0004310 A1 | 6/2001 | Kono |
| 2001/0008535 A1 | 7/2001 | Lanigan |
| 2001/0011308 A1 | 8/2001 | Clark et al. |
| 2001/0018858 A1 | 9/2001 | Dwek |
| 2001/0021053 A1 | 9/2001 | Colbourne et al. |
| 2001/0021305 A1 | 9/2001 | Sugiyama et al. |
| 2001/0021998 A1 | 9/2001 | Margulis |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0013784 A1 | 1/2002 | Swanson |
| 2002/0013852 A1 | 1/2002 | Janik |
| 2002/0013853 A1 | 1/2002 | Baber et al. |
| 2002/0019984 A1 | 2/2002 | Rakib |
| 2002/0045960 A1 | 4/2002 | Phillips et al. |
| 2002/0046315 A1 | 4/2002 | Miller et al. |
| 2002/0055934 A1 | 5/2002 | Lipscomb et al. |
| 2002/0073139 A1 | 6/2002 | Hawkins et al. |
| 2002/0074413 A1 | 6/2002 | Henzerling |
| 2002/0078075 A1 | 6/2002 | Colson et al. |
| 2002/0081098 A1 | 6/2002 | Scally |
| 2002/0095663 A1 | 7/2002 | Joory |
| 2002/0103554 A1 | 8/2002 | Coles et al. |
| 2002/0113824 A1 | 8/2002 | Myers |
| 2002/0116082 A1 | 8/2002 | Gudorf |
| 2002/0118848 A1 | 8/2002 | Karpenstein |
| 2002/0133515 A1 | 9/2002 | Kagle et al. |
| 2002/0133824 A1 | 9/2002 | Mensch |
| 2002/0138606 A1 | 9/2002 | Robison |
| 2002/0156921 A1 | 10/2002 | Dutta et al. |
| 2002/0161865 A1 | 10/2002 | Nguyen |
| 2002/0164973 A1 | 11/2002 | Janik et al. |
| 2002/0174243 A1 | 11/2002 | Spurgat et al. |
| 2002/0174269 A1 | 11/2002 | Spurgat et al. |
| 2002/0194309 A1 | 12/2002 | Carter et al. |
| 2002/0196912 A1 | 12/2002 | Norris |
| 2003/0013332 A1 | 1/2003 | Lin |
| 2003/0013493 A1 | 1/2003 | Irimajiri et al. |

(56) References Cited

U.S. PATENT DOCUMENTS

| | | |
|---|---|---|
| 2003/0013492 A1 | 2/2003 | Bokhari et al. |
| 2003/0030733 A1 | 2/2003 | Seaman et al. |
| 2003/0037254 A1 | 2/2003 | Fischer et al. |
| 2003/0045955 A1 | 3/2003 | Janik |
| 2003/0046434 A1 | 3/2003 | Flanagin et al. |
| 2003/0050058 A1 | 3/2003 | Walsh et al. |
| 2003/0065802 A1 | 4/2003 | Vitikainen et al. |
| 2003/0074457 A1 | 4/2003 | Kluth |
| 2003/0076301 A1 | 4/2003 | Tsuk et al. |
| 2003/0079038 A1 | 4/2003 | Robbin et al. |
| 2003/0083954 A1 | 5/2003 | Namba |
| 2003/0097379 A1 | 5/2003 | Ireton |
| 2003/0112279 A1 | 6/2003 | Irimajiri |
| 2003/0120742 A1 | 6/2003 | Ohgami et al. |
| 2003/0131360 A1 | 7/2003 | Joung et al. |
| 2003/0134589 A1 | 7/2003 | Oba |
| 2003/0158737 A1 | 8/2003 | Csicsatka |
| 2003/0167318 A1 | 9/2003 | Robbin et al. |
| 2003/0181203 A1 | 9/2003 | Cheshire |
| 2003/0182315 A1 | 9/2003 | Plastina et al. |
| 2003/0191756 A1 | 10/2003 | Oh |
| 2003/0197725 A1 | 10/2003 | Tuli |
| 2003/0210821 A1 | 11/2003 | Yogeshwar et al. |
| 2003/0221161 A1 | 11/2003 | Balassanian et al. |
| 2003/0221541 A1 | 12/2003 | Platt |
| 2003/0229900 A1 | 12/2003 | Reisman |
| 2004/0001395 A1 | 1/2004 | Keller et al. |
| 2004/0001396 A1 | 1/2004 | Keller et al. |
| 2004/0001494 A1 | 1/2004 | Barrack et al. |
| 2004/0003151 A1 | 1/2004 | Bateman et al. |
| 2004/0004338 A1 | 1/2004 | Jung |
| 2004/0017997 A1 | 1/2004 | Cowgill |
| 2004/0027930 A1 | 2/2004 | Kudo |
| 2004/0031058 A1 | 2/2004 | Reisman |
| 2004/0045030 A1* | 3/2004 | Reynolds ............... H04L 29/06 725/110 |
| 2004/0055446 A1 | 3/2004 | Robbin et al. |
| 2004/0057446 A1 | 3/2004 | Varsa et al. |
| 2004/0068536 A1 | 4/2004 | Demers |
| 2004/0072584 A1 | 4/2004 | Kern |
| 2004/0076086 A1 | 4/2004 | Keller et al. |
| 2004/0078416 A1 | 4/2004 | Kawasaki et al. |
| 2004/0128198 A1 | 7/2004 | Register et al. |
| 2004/0128402 A1 | 7/2004 | Weaver et al. |
| 2004/0132510 A1 | 7/2004 | Yamashita |
| 2004/0133908 A1 | 7/2004 | Smith et al. |
| 2004/0139180 A1 | 7/2004 | White et al. |
| 2004/0139233 A1* | 7/2004 | Kellerman ........ H04L 29/08756 709/246 |
| 2004/0139844 A1 | 7/2004 | Tsuboi |
| 2004/0143442 A1 | 7/2004 | Knight |
| 2004/0157548 A1 | 8/2004 | Eyer |
| 2004/0174896 A1 | 9/2004 | Caspi et al. |
| 2004/0177063 A1 | 9/2004 | Weber et al. |
| 2004/0177371 A1 | 9/2004 | Caspi et al. |
| 2004/0177377 A1 | 9/2004 | Lin et al. |
| 2004/0179540 A1 | 9/2004 | Lee et al. |
| 2004/0193900 A1 | 9/2004 | Nair |
| 2004/0215611 A1 | 10/2004 | Jawa et al. |
| 2004/0215810 A1 | 10/2004 | Tan et al. |
| 2004/0216108 A1 | 10/2004 | Robbin |
| 2004/0221088 A1 | 11/2004 | Lisitsa et al. |
| 2004/0223622 A1 | 11/2004 | Lindemann et al. |
| 2004/0225762 A1 | 11/2004 | Poo |
| 2004/0234088 A1 | 11/2004 | McCarty et al. |
| 2004/0236568 A1 | 11/2004 | Guillen et al. |
| 2004/0242224 A1 | 12/2004 | Janik et al. |
| 2004/0250273 A1 | 12/2004 | Swix et al. |
| 2004/0252604 A1 | 12/2004 | Johnson et al. |
| 2004/0255326 A1 | 12/2004 | Hicks et al. |
| 2004/0261040 A1 | 12/2004 | Radcliffe et al. |
| 2004/0261112 A1 | 12/2004 | Hicks |
| 2004/0267825 A1 | 12/2004 | Novak et al. |
| 2005/0010616 A1 | 1/2005 | Burks |
| 2005/0055444 A1 | 3/2005 | Venkatasubramanian |
| 2005/0071375 A1 | 3/2005 | Houghton et al. |
| 2005/0080915 A1 | 4/2005 | Shoemaker et al. |
| 2005/0089052 A1 | 4/2005 | Chen et al. |
| 2005/0147130 A1 | 7/2005 | Hurwitz et al. |
| 2005/0174488 A1 | 8/2005 | Chennakeshu |
| 2005/0201360 A1 | 9/2005 | Redstone |
| 2005/0201398 A1 | 9/2005 | Naik et al. |
| 2005/0207726 A1 | 9/2005 | Chen |
| 2005/0226233 A1 | 10/2005 | Kryuchkov et al. |
| 2005/0235015 A1 | 10/2005 | Abanami et al. |
| 2005/0235048 A1 | 10/2005 | Costa-Requena et al. |
| 2005/0240494 A1 | 10/2005 | Cue et al. |
| 2005/0240661 A1 | 10/2005 | Heller et al. |
| 2005/0240745 A1 | 10/2005 | Iyer et al. |
| 2005/0254447 A1 | 11/2005 | Miller-Smith |
| 2005/0262528 A1 | 11/2005 | Herley et al. |
| 2005/0265316 A1 | 12/2005 | Liu et al. |
| 2005/0273790 A1 | 12/2005 | Kearney et al. |
| 2005/0289224 A1 | 12/2005 | Deslippe et al. |
| 2006/0007943 A1 | 1/2006 | Fellman |
| 2006/0015580 A1 | 1/2006 | Gabriel et al. |
| 2006/0027080 A1 | 2/2006 | Schultz |
| 2006/0030961 A1 | 2/2006 | Lin |
| 2006/0062242 A1 | 3/2006 | Dacosta |
| 2006/0062243 A1 | 3/2006 | Dacosta |
| 2006/0067463 A1 | 3/2006 | Hack et al. |
| 2006/0069724 A1 | 3/2006 | Langdon |
| 2006/0074637 A1 | 4/2006 | Berreth |
| 2006/0083194 A1 | 4/2006 | Dhrimaj |
| 2006/0090202 A1 | 4/2006 | Liu et al. |
| 2006/0092844 A1 | 5/2006 | Jeon et al. |
| 2006/0100978 A1 | 5/2006 | Heller et al. |
| 2006/0106806 A1 | 5/2006 | Sperling et al. |
| 2006/0117371 A1 | 6/2006 | Margulis |
| 2006/0126667 A1 | 6/2006 | Smith et al. |
| 2006/0143455 A1 | 6/2006 | Gitzinger |
| 2006/0159109 A1 | 7/2006 | Lamkin et al. |
| 2006/0167982 A1 | 7/2006 | Jawa et al. |
| 2006/0168340 A1 | 7/2006 | Heller et al. |
| 2006/0168351 A1 | 7/2006 | Ng et al. |
| 2006/0224620 A1 | 10/2006 | Silverman et al. |
| 2006/0245451 A1 | 11/2006 | Wakid |
| 2006/0253279 A1 | 11/2006 | Sung |
| 2006/0274747 A1 | 12/2006 | Duchscher et al. |
| 2006/0277216 A1 | 12/2006 | Shukhman |
| 2006/0288057 A1 | 12/2006 | Collins et al. |
| 2007/0033052 A1 | 2/2007 | Cowgill |
| 2007/0038941 A1 | 2/2007 | Wysocki et al. |
| 2007/0067309 A1 | 3/2007 | Klein et al. |
| 2007/0073723 A1 | 3/2007 | Ramer et al. |
| 2007/0073728 A1 | 3/2007 | Klein et al. |
| 2007/0074118 A1 | 3/2007 | Robbin et al. |
| 2007/0084333 A1 | 4/2007 | Robbin et al. |
| 2007/0088727 A1 | 4/2007 | Kindig |
| 2007/0088764 A1 | 4/2007 | Yoon et al. |
| 2007/0110074 A1 | 5/2007 | Bradley |
| 2007/0124680 A1 | 5/2007 | Robbin et al. |
| 2007/0130541 A1 | 6/2007 | Louch et al. |
| 2007/0169115 A1 | 7/2007 | Ko et al. |
| 2007/0185919 A1 | 8/2007 | Kaplan et al. |
| 2007/0203954 A1 | 8/2007 | Vargas et al. |
| 2007/0220552 A1 | 9/2007 | Juster et al. |
| 2007/0250761 A1 | 10/2007 | Bradley et al. |
| 2007/0271312 A1 | 11/2007 | Heller et al. |
| 2007/0291323 A1 | 12/2007 | Roncal |
| 2008/0018927 A1 | 1/2008 | Martin et al. |
| 2008/0028008 A1 | 1/2008 | Brunet et al. |
| 2008/0086494 A1 | 4/2008 | Heller et al. |
| 2008/0164581 A1 | 7/2008 | Cho et al. |
| 2008/0168185 A1 | 7/2008 | Robbin et al. |
| 2008/0168245 A1 | 7/2008 | De Atley et al. |
| 2008/0168391 A1 | 7/2008 | Robbin et al. |
| 2008/0168525 A1 | 7/2008 | Heller et al. |
| 2008/0168526 A1 | 7/2008 | Robbin et al. |
| 2008/0229335 A1 | 9/2008 | Robbin et al. |
| 2009/0290725 A1 | 11/2009 | Huang |

(56) References Cited

U.S. PATENT DOCUMENTS

| | | |
|---|---|---|
| 2011/0264732 A1 | 10/2011 | Robbin et al. |
| 2014/0006946 A1 | 1/2014 | Robbin et al. |

FOREIGN PATENT DOCUMENTS

| | | |
|---|---|---|
| EP | 0917077 A2 | 5/1999 |
| EP | 0982732 A1 | 3/2000 |
| EP | 1028425 A2 | 8/2000 |
| EP | 1112931 A2 | 7/2001 |
| EP | 1122931 | 8/2001 |
| EP | 1143719 | 10/2001 |
| EP | 1353269 A2 | 10/2003 |
| EP | 1408427 A2 | 4/2004 |
| EP | 1429569 A1 | 6/2004 |
| EP | 1463334 | 9/2004 |
| EP | 1523171 | 4/2005 |
| EP | 1548740 A2 | 6/2005 |
| EP | 1751949 A1 | 2/2007 |
| EP | 2360887 A1 | 8/2011 |
| EP | 2375678 | 10/2011 |
| JP | 2000-339917 A | 12/2000 |
| JP | 2001-093226 A | 4/2001 |
| JP | 2001-117800 A | 4/2001 |
| JP | 2003-077214 A | 3/2003 |
| JP | 2003-303137 A | 10/2003 |
| JP | 2003-319485 A | 11/2003 |
| KR | 10-2001-0063284 A | 7/2001 |
| KR | 10-2001-0079176 A | 8/2001 |
| KR | 10-2002-0001127 A | 1/2002 |
| KR | 10-2002-0011027 A | 2/2002 |
| KR | 10-2006-0035634 A | 4/2006 |
| KR | 10-0599204 B1 | 7/2006 |
| WO | 94/08337 A1 | 4/1994 |
| WO | 95/16950 A1 | 6/1995 |
| WO | 00/43914 A1 | 7/2000 |
| WO | WO2001/26374 | 4/2001 |
| WO | 01/33569 A1 | 5/2001 |
| WO | 01/67753 A1 | 9/2001 |
| WO | 02/25610 A1 | 3/2002 |
| WO | 02/25935 A2 | 3/2002 |
| WO | 02/65723 A1 | 8/2002 |
| WO | 02065732 | 8/2002 |
| WO | WO2002065732 | 8/2002 |
| WO | 03009601 | 1/2003 |
| WO | WO2003/009601 | 1/2003 |
| WO | 2003/023786 A2 | 3/2003 |
| WO | 2003/036541 A1 | 5/2003 |
| WO | WO2003/038637 | 5/2003 |
| WO | 2004/004338 A1 | 1/2004 |
| WO | 2004/034286 A1 | 4/2004 |
| WO | 2004/057474 A1 | 7/2004 |
| WO | 2004/084413 A2 | 9/2004 |
| WO | 2005/060387 A2 | 7/2005 |
| WO | 2005/114472 A1 | 12/2005 |
| WO | 2005/122531 A1 | 12/2005 |
| WO | 2006/007322 A2 | 1/2006 |
| WO | 2006/047578 A2 | 5/2006 |
| WO | 2007/079360 A1 | 7/2007 |
| WO | WO2007/079334 | 7/2007 |
| WO | 2008/033771 A2 | 3/2008 |

OTHER PUBLICATIONS

Schulzrinne Comumbia U A Rao Netscape R Lanphier RealNetworks H: "Real Time Streaming Protocol (RTSP)" IETF Standard, Internet Engineering Task Force, IETF, Ch, Apr. 1998.

DLink: "D-Link's New Wireless Media Device Plays Digital Music, Videos, and Photos on Home Television and Stereo" Jan. 20, 2004, pp. 1-2, Retrieved from the Internet: URL:http://presslink.dlink.com/pr/?prid=136.

Palacharla et al.: "Design and Implementation of a Real-time Multimedia Presentation System using RTP", Computer Software and Applications Conference, Aug. 13, 1997, pp. 376-381.

Perkins C.: "RTP Audio and Video for the Internet" 2003, Addison-Wesley, pp. 107-109.

Clifton, David, "pipe.c, A Kla2 Module", 2003, 10 pages. Retrieved on Oct. 17, 2011 from http://www.codelode.com/Kernel/k1a2pepec.html.

Hughes, M., "Turning Streams Inside Out, Part 2: Optimizing internal Java I/O", Sep. 3, 2002, 12 pages. Retrieved on Oct. 19, 2011 from http://50001.com/language/javaside/lec/java_ibm/%BD%BA%%C6%AE%B8%B2%20% . . . .

Apple, "Mac OS X: Bonjour," Technology Brief, Apr. 2005, 6-pgs.

Apple, "AirPort Express," Technology Overview, Jul. 2004, 31-pgs.

Mills, David L., "Request for Comments: 1305," Network Working Group, Mar. 1992, 113-pgs.

Shulzrinne et al., "Request for Comments: 3550," Network Working Group, Jul. 2003, 104-pgs.

Stewart et al., "Request for Comments: 3758," Network Working Group, May 2004, 22-pgs.

Titmus, Richard, "Softsqueeze 2.0," obtained from http://softsqueeze.souceforge.nett, generated Jun. 8, 2006, copyright 2004, 2005, 1 pg.

Slim Devices, Inc., "Slim Devices: Squeezebox: Free Your Music'.," obtained from http://www.slimdevices.com/index.html, generated Jun. 8, 2006, copyright 2002-2004, 1-pg.

Slim Devices, Inc., "Slim Devices: Squeezebox: Overview," obtained from http://www.slimdevices.com/pi_overview.html, generated Jun. 21, 2006, copyright 2002-2006, 1 pg.

Slim Devices, Inc., "Slim Devices: Support: FAQ," obtained from http://www.slimdevices.com/sufaq.html, generated Jun. 21, 2006, copyright 2002-2006, 16-pgs.

Snarfed.org, "History of Synchronizing mp3 playback," obtained from http://snarfed.org/exec/history?name=synchronizing+mp3+playback, generated Jun. 8, 2006, 3-pgs.

Maulik, "Synchronizing mp3 playback, version #1," obtained from http://snarfed.org/exec/version?name=synchronizing+mp3+playback&version=1, generated Jun. 8, 2006, version #1 dated Nov. 8, 2004 in history, 2-pgs.

Maulik, "Synchronizing mp3 playback, version #2," obtained from http://snarfed.org/exec/version?name=synchronizing+mp3+playback&version=2, generated Jun. 8, 2006, version #2 dated Dec. 28, 2004 in history, 2-pgs.

Maulik and Ryan, "Synchronizing mp3 playback, version #3," obtained from http:/Isnarfed.orglexec/version?name=synchronizing+mp3+playback&version=3, generated Jun. 8, 2006, version #3 dated Jan. 2, 2005 in history, 3-pgs.

Maulik and Ryan, "Synchronizing mp3 playback, version #4," obtained from http:/Isnarfed.orglexec/version?name=synchronizing+mp3+playback&version=4, generated Jun. 8, 2006, version #4 dated Jan. 3, 2005 in history, 3-pgs.

Maulik and Ryan, "Synchronizing mp3 playback, version #5," obtained from http:/Isnarfed.orglexec/version?name=synchronizing+mp3+playback&version=5, generated Jun. 8, 2006, version #5 dated Jan. 19, 2005 in history, 3-pgs.

Maulik and Ryan, "Synchronizing mp3 playback, version #6," obtained from http://snarfed.org/exec/version?name=synchronizing+mp3+playback&version=6, generated Jun. 8, 2006, version #6 dated Feb. 2, 2005 in history, 3-pgs.

Snarfed.org, "libmsntp," obtained from http://snarfed.org/space/libmsntp, generated Jun. 8, 2006, undated, 2-pgs.

K*Software, "kquery.Com," obtained from http://www.kquery.com/index.php? p.=software_info&subpage=1&id=8, generated Jun. 8, 2006, copyright 2004, 3-pgs.

Myradus, LLC, "Myradus Media Player Puppeteer for iTunes," obtained from http:I/www.myradus.com/Product_MediaPlayerPuppeteerForm.aspx, generated Jun. 8, 2006, copyright 2004-2005, 1-pg.

Slim Devices, Inc., "Squeezebox 2: Owner's Guide," copyright 2005, 28-pgs.

Slim Devices, Inc., "Squeezebox: Owner's Guide," copyright 2006, 32-pgs.

Nullsoft, "winamp.Com I Plug-ins," obtained from http://winamp.com/plugins/details.php?id=15667, generated Jun. 8, 2006, copyright 2006, 2-pgs.

(56) References Cited

OTHER PUBLICATIONS

Zheng et al., "MobiGATE: a mobile gateway proxy for the active deployment of transport entities," Proceedings of the 2004 International Conference on Parallel Processing, Piscataway, NJ, Aug. 15, 2004 pp. 1-8 from IEEE on Jul. 2011.
Window's Media Player 6.4, Microsoft Corp., copyright 1999, software available at http://www.oldversion.com/program.php?n=wmp [.about. Downloaded Jul. 13, 2011 at: http://www.microsoft.com/download.en/confirmation.axps?displaylang-en&id=-22758].
Wikipedia: "iTunes", www.wikipedia.com, May 9, 2005, 6 pages.
WebReviews.com, "Rio Portable Music Player," 2 pgs, 1999 (downloaded Jan. 25, 2002 from download http://www.webreviews.com/9901/rio.html).
TuneBase Pro Mk-II User's Guide, Escient, Inc., (1999) Downloaded Jul. 25, 2011.
TuneBase 100 User Guide, a CD Library Management System, Escient, Inc. copyright 1999. (101 Pages).
Travis Butler, "Archos Jukebox 6000 Challenges Nomad Jukebox," Aug. 13, 2001, available from http://db.tidbits.com/getbits.acgi?tbart=06521—Downloaded Jul. 13, 2011 @ http://www.tidbits.com/article/6521?print version=1.
Top Stores of Dec. 18, 2001: Apple posts Automated Scripts for iTunes 2.03. downloaded 9 pages on Apr. 11, 2012 from the internet at: http://www.xlr8yourmac.com/archive/dec01/121801.html.
Steinberg, "Sonicblue Rio Car," Product Review, Dec. 12, 2000 (downloaded from http://electronics.cnet.com/electronics/0-6342420-1304-4098389.html).
snarfed.org,"libmsnip," obtained from http://snarfed.org/spact/libmsntp, generated Jun. 8, 2006, undated, 2 pgs.
Shulzrinne et al., "Request for Comments: 2326," Network Working Group, Apr. 1998, 92-pgs.
Rio Portable Music Player, Web Review, downloaded Jan. 25, 2002, http://www.webreviews.com/9901/rio.html.
RealJukebox Plus Manual, Real Networks, Inc., copyright 1999, pp. 1-83, RealJukebox, Real Networks, Inc., webpages downloaded Oct. 27, 2005 http://www.real.com/Jukebmdrelease.sub.--notes.html#.
Pocket Tunes 5.0.0. copyright 2002-2009 Normsoft, Inc., (pp. 1-25, obtained from the Internet at: http://www.pocket-tunes.com/userguide/en.win)—[Downloaded 18 pages on Apr. 10, 2012 at http://www.pocket-tunes.com/userguide/en/).
Pocket PC Phone User Manual, High Tech Computer Corp., 2006; 208 pages, Downloaded Jul. 2011 www.htc.com.
Nomad Jukebox, User Guide, Creative Technology Ltd., Version 1, Aug. 2000. [38 pages downloaded Aug. 16, 2011].
MusicMatch, "About MusicMatch Jukebox," MusicMatch Jukebox v4 Help, 4 pgs, 1999.
Microsoft Corp., "Window's Media Player 6.4," 2 pgs, 1999 (software downloadable at http://www.oldversion.com/program php?n=wmp, downloaded Jul. 13, 2011 from http://www.microsoft.com/download/en/confirmation.axps?displaylangen&id=2-2758).
Maulik and Ryan, Synchronizing mp3 playback, version #17, obtained from http://snarfed.org/exec/version?name=synchronizing+mp3+playback&version=1-7, generated Jun. 8, 2006, version #17 dated Feb. 25, 2006 in history, 4 pgs.
iTunes-perl, copyright 2004-2006 by Jay McGavren, obtained from the Internet at http://code.googlecom, pp. 7. (downloaded 5 pages on Jan. 13, 2012 from http://code.google.com/p/itunes-perl/wiki/Usage).
Hughes, M., "Turning Streams Inside Out, Part 2: Optimizing internal Java I/O", Sep. 3, 2002, 12 pages. [downloaded Apr. 11, 2012 at: http://underpop.free.fr/j/java/streams/j-io2.pdf].
Glenn Fleishman, "Handheld iPod joins MP3 band a bit late, but is standout player," Nov. 6, 2001, http://seattletimes,nwsource.com/html/businesstechnology/134361811.sub.--- ptmacc040.html. [Downloaded Jul. 21, 2011 from http://web.archive.org/... 001110233639/http://seattletimes.nwsource.com/h-tml/businesstechnology/134361811.sub.--ptmacc040.html].

Firewire, IEEE 1394 (also known as Sony's iLink), (http://www.wikipedia.org/wiki/Firewire (1995)). Download Jul. 13, 2011—http://en.wikipedia.org/wiki/IEEE.sub.--1393.sub.--interface.
Compaq Computer Corp., copyright 1991, Personal Jukebox User Manual, pp. 1-29.
Butler, "Portable MP3: The Nomad Jukebox," Aug. 1, 2001 (http:lldb.tidbits.com/getbits.acgi? tbart=06261, downloaded Jul. 13, 2011 from http://www.tidbits.com/article/6261).
Bridgman, "Windows XP Expert Zone Community Columnist", Using Windows Mobile-based Portable Media Centers and Windows Media Player 10, Aug. 25, 2004, 1-11.
Apple Inc., "iTunes, Digital Music for your Mac," 2 pgs (downloaded Oct. 22, 2001 from http://www.apple.com/itunes/).
Apple Announces iTunes 2, Press Release, Apple Computer, Inc., dated Oct. 23, 2001 http://www.apple.com/pr/library/2001/10/23Apple-Announces-iTunes-2.html] downloaded Apr. 8, 2012.
Alicia Awbrey, press release entitled "Apple's iPod Available in Stores Tomorrow," Nov. 9, 2001 [downloaded Jul. 14, 2011 at http://www.apple.com/pr/library/2001/11/09Apple-s-iPod-Available].
Adam C. Engst. "SoundJam Keeps on Jammin'." Jun. 19, 2000, available from http://db.tidbits.com/getbits.acgi?tbart=05988. downloaded Jul. 25, 2011 at http?..db.tidbits.com/article/5988?print?version+1.
About MusicMatch Jukebox, MusicMatch Jukebox v4 Help. pp. 1-4, (1999).
Zheng et al., "MobiGATE: a mobile gateway proxy for the active deployment of transport entities," Proceedings of the 2004 International Conference on Parallel Processing, Piscataway, NJ, Aug. 15, 2004 pp. 1-8 from IEEE on Jul. 2011 (U.S. Appl. No. 11/519,429).
Window's Media Player 6.4, Microsoft Corp., copyright 1999, software available at hftp://www.oldversion.com/program.php?n=wmp [about.Downloaded Jul. 13, 2011 at: http://www.microsoft.com/download.en/confirmation.axps? displaylang-en&id=- 22758] (U.S. Appl. No. 11/519,429).
Wikipedia: "iTunes", www.wikipedia.com, May 9, 2005, 6 pages. (U.S. Appl. No. 11/519,429).
Wikipedia, "IEEE 1394," 13 pgs (Firewire and also known as Sony's iLink) (downloaded from https://en.wikipedia.org/wiki/IEEE.sub.-1394).
Vetro et al., "Media Conversions to Support Mobile Users," IEEE Canadian Conference on Electrical and Computer.
TuneBase Pro Mk-II User's Guide, Escient, Inc., (1999) Downloaded Jul. 25, 2011 (U.S. Appl. No. 11/519,429).
TuneBase 100 User Guide, a CD Library Management System, Escient, Inc. copyright 1999. (101 pages) (U.S. Appl. No. 11/519,429).
Travis Butler, "Portable MP3: The Nomad Jukebox," Aug. 1, 2001, available from http://db.tidbits.com/getbits.acgi?tbart=06261—downloaded Jul. 13, 2011 at http://www.tidbits.com/article/6261 (U.S. Appl. No. 11/519,429).
Travis Butler, "Archos Jukebox 6000 Challenges Nomad Jukebox," Aug. 13, 2001, available from http://db.tidbits.com/getbits.acgi?tbart=06521—Downloaded Jul. 13, 2011 @ http://www.tidbits.com/article/6521?print version=1 (U.S. Appl. No. 11/519,429).
Top Stores of Dec. 18, 2001: Apple posts Automated Scripts for iTunes 2.01 downloaded 9 pages on Apr. 11, 2012 from the internet at: http://www.x1r8yourmac.com/archive/dec01/121801.html (U.S. Appl. No. 11/519,429).
SoundJam MP Plus Manual, version 2.0—MP3 Player and Encoder for Macintosh by Jeffrey Robbin, Bill Kincaid and Dave Heller, manual by Tom Negrino, published by Casady & Greene, Inc. 2000. 80 pages (U.S. Appl. No. 11/519,429).
snarfed.org, "libmsnip," obtained from http://snarfed.org/spact/libmsntp, generated Jun. 8, 2006, undated, 2 pgs.
Skarlatos et al., "Sprite Backup 5.0", Internet Publication, Mar. 6, 2005 (downloaded www.pocketnow.com/index.php?a+portal print &t=review&id=788).
Sinitsyn, "A Synchronization Framework for Personal Mobil Servers," Proceedings of the Second IEEE Annual conference on Pervasive Computing and communications Workshops, Piscataway, NJ, Mar. 14, 2004, pp. 1-4 5 pages retrieved from IEEE on Jul. 2011 (U.S. Appl. No. 11/519,429).

(56) References Cited

OTHER PUBLICATIONS

Rosenberg, J. et al., "SIP: Session Initiation Protocol", 20020601; 20020600, Jun. 1, 2001, Retrieved from ftp://frp-editor.org/in-notes/rfc3261.txt on Aug. 18, 2011, 232 pages.
Robbin et al., "SoundJam MP Plus Digital Audio System Version 2," Representative Screens, published by Cassady & Greene, Inc., Salinas, CA, 6 pgs, 2000.
Rio Portable Music Player, Web Review, downloaded Jan. 25, 2002, http://www.webreviews.com/9901/rio.html. (U.S. Appl. No. 11/519,429).
Replay Gain, "Replay Gain—A proposed Standard," Oct. 7, 2001 (downloaded from http://replaygain.hydrogenaudio.org/index.html and http://replaygain.hydrogenaudio.orgioutline.html).
RealJukebox Plus Manual, Real Networks, Inc., copyright 1999, pp. 1-83, RealJukebox, Real Networks, Inc., webpages downloaded Oct. 27, 2005 http://www.real.com/Jukebox/release.sub.—notes. html#. (U.S. Appl. No. 11/519,429).
RCA, "Lyra User's Guide," RD2201/2202/2204, www.lyrazone.com, pp. 1-37, 1999.
Pocket Tunes 5.0.0. copyright 2002-2009 Normsoft, Inc., (pp. 1-25, obtained from the Internet at: http://www.pocket-tunes.com/userguide/en.win)—[Downloaded 18 pages on Apr. 10, 2012 at http://www.pocket-tunes.com/userguide/en/) (U.S. Appl. No. 11/519,429).
Pocket PC Phone User Manual, High Tech Computer Corp., 2006; 208 pages, Downloaded Jul. 2011 www.htc.com (U.S. Appl. No. 11/519,429).
Personal Jukebox (PJB), "Systems Research Center and PAAD," Compaq Computer Corp., Oct. 13, 2000, http://research.compaq.com/Src/pjbL (U.S. Appl. No. 11/519,429).
Perfect guide for digital/audio technique to enjoy music in PC, Nobuya Fukuda, published in "Nikkei Click", Japan, Nikkei business Publications, Inc., Sep. 8, 1999, vol. 6/No. 10, p. 169. (U.S. Appl. No. 11/519,429).
Palm, Inc., "Handbook for PalmTM m500 Series Handhelds, User Manual," 109 pgs., 2001.
Nutzel et al., "Sharing System for Future HiFi Systems", Proceedings of the Fourth International Conference on Web Delivering of Music, Sep. 13, 2004, 8 pgs. [9 pages downloaded] (U.S. Appl. No. 11/519,429).
Nomad Jukebox, User Guide, Creative Technology Ltd., Version 1, Aug. 2000. [38 pages downloaded Aug. 16, 2011] (U.S. Appl. No. 11/519,429).
Nilsson, "IDS tag versions 2.4.0.—Main Structure," Nov. 1, 2000 (downloaded from http://www.id3.org/id3v2.4.0-structure?-action=print).
Nilsson, "ID3 tag version 23.0," 30 pgs, Feb. 3, 1999 (downloaded from http://www.id3.org/id3v2.3.0?action=print).
MusicMatch, "Musicmatch and Xing Technology Introduce Musicmatch Jukebox," May 18, 1998 (http://www.musicmatch.com/info/company/press/rel eases/?year +1998& release=2, downloaded Aug. 16, 2011 from http://www.thefreelibrary.com/MusicMatch+and+Xing+Technolo).
Miniman, "Applian Software's Replay Radio and Player v1.02," Product Review, Jul. 31, 2001 (pocketnow.com, http://www.pocketnow.com/reviews/replay.htm, downloaded Aug. 25, 2011 from http://web/archive.org/web/20010805081914/http://www.pocketnow.com/reviews.
Microsoft Corp., "Window's Media Player 6.4," 2 pgs, 1999 (software downloadable at http://www.oldversion.com/programphp?n=wmp, downloaded Jul. 13, 2011 from http://www.microsoft.com/download/en/confirmation.axps?displaylangen&id=2-2758).
MediaGate, "Portable MPEG4 Player (MG-25)," 3 pgs, Jul. 29, 2004.
McGavren, "iTunes-perl," 2004-2006 (http://code.googlecom, 5 pgs (downloaded Jan. 13, 2012 from http://code.google.com/p/itunes-perl/wiki/Usage).
Maulik and Ryan, "Synchronizing mp3 playback, version #9," obtained from http://snarfed.org/execiversion?name=synchronizing+mp3+playback&version=9- , generated Jun. 8, 2006, version #9 dated Mar. 3, 2005 in history, 3-pgs.
Maulik and Ryan, "Synchronizing mp3 playback, version #8," obtained from http://snarfed.org/exec/version?name=synchronizing+mp3+playback&version=8, generated Jun. 8, 2006, version #8 dated Feb. 23, 2005 in history, 3-pgs.
Maulik and Ryan, "Synchronizing mp3 playback, version #7," http://snarfed.org/execiversion?name=synchronizing+mp3+playback&version=7, generated Jun. 8, 2006, version #7 dated Feb. 21, 2005 in history, 3 pgs.
Markt+Technik Verlag, "iPod+iTunes," 1 pg, 2007 (German).
iTunes-perl, copyright 2004-2006 by Jay McGavren, obtained from the Internet at http://code.googlecom, pp. 7. (downloaded 5 pages on Jan. 13, 2012 from http://code.google.com/p/itunes-perl/wiki/Usage) (U.S. Appl. No. 11/519,429).
iTunes, Playlist Related Help Screens, iTunes v1.0, Apple Computer, Inc., Jan. 2001 (U.S. Appl. No. 11/519,429).
iTunes, Digital Music for your Mac, Apple Computer, Inc., downloaded Oct. 22, 2011, http://www.apple.com/itunes/ (U.S. Appl. No. 11/519,429).
iTunes 2, Playlist Related Help Screens, iTunes v2.0 Apple Computer, Inc., Oct. 23, 2001 (U.S. Appl. No. 11/519,429).
Iriver, "PMP140/120," 2 pgs, Sep. 13, 2004.
Hughes, M., "Turning Streams Inside Out, Part 2: Optimizing internal Java I/O", Sep. 3, 2002, 12 pages [downloaded Apr. 11, 2012 at: http://underpop.free.fr/j/javaistreams/j-io2.pdf] (U.S. Appl. No. 11/306,557).
Hewlett Packard Jornada 525 Color Pocket PC, downloaded Jan. 25, 2002, http://www.pc4d.com/electronics/products/56/jornada.sub.--525.sub.-color-.sub.--pocket.sub.--pc.shtml. (U.S. Appl. No. 11/519,429).
Hei et al., "iPod+iTunes," iTunes7, Markt+Technik Verlag, 54 pgs, Dec. 22, 2006 (German).
Harmony Central, "Diamond Multimedia Announces Rio PMP300 Portable MP3 Music Player", Press Release, 4 pgs, 39/14/1998 (http://news.harmony-central.com/Newp/1988/Rio-Pump300.html, downloaded Aug. 16, 2011 from http://web.archive.org/web/20030705005208/http:/.
Handbook for Palm.TM. m500 Series Handhelds,User Manual.—(286 pages) (U.S. Appl. No. 11/519,429), 2001.
Glenn Fleishman, "Handheld iPod joins MP3 band a bit late, but is standout player," Nov. 6, 2001, http://seattletimes,nwsource.com/html/businesstechnology/134361811.sub.---ptmacc040.html.
[Downloaded Jul. 21, 2011 from http:// web.archive.org/... 001110233639/http://seattletimes.nwsource.com/h-tmlibusinesstechnology/134361811.sub.--ptmacc040.html] (U.S. Appl. No. 11/519,429).
Fukuda, "Perfect Guide for Digital/Auio Technique to Enjoy Music in PC," Nikkei Click, Japan, Nikkei Business Publications, Inc., vol. 6, No. 10, 1 pg, Sep. 8, 1999.
Firewire, IEEE 1394 (also known as Sony's iLink), (http://www.wikipedia.org/wiki/Firewire (1995)). Download Jul. 13, 2011—http://en.wikipedia.org/wiki/IEEE.sub.-1393.sub.--interface (U.S. Appl. No. 11/519,429).
Etchison, "Accelerated discrete Adjustment of the Parameters of a Process", IBM Technical Disclosure Bulletin, vol. 15, No. 5, Oct. 1, 1972, 2 pgs. (U.S. Appl. No. 11/519,429).
Escient, Inc., "TuneBase Pro Mk-II User's Guide," 1999 (downloaded Jul. 25, 2011).
Erdmann et al., "iPod+iTunes," O'Reilly, 157 pgs, 2006 (German).
Engst, "SoundJam Keeps on Jammin'," Jun. 19, 2000, (http://db.tidbits.com/getbits.acgi?tbart=05988, downloaded Jul. 25, 2011 from http?..db.tidbits.com/article/5988?print version+1).
Digital Still Cameras—Downloading Images to a Computer, Mimi Chakarova et al., Multi-Media Reporting and Convergence, 2 pgs. (U.S. Appl. No. 11/519,429), 2014.
Diamond Multimedia Announces Rio PMP300 Portable MP3 Music Player, Press Release, http://news.harmony-central.com/Newp/1988/Rio-Pump300.html, Sep. 14, 1998, 4 pgs. Downloaded on

(56) References Cited

OTHER PUBLICATIONS

Aug. 16, 2011—http://www.archive.org/web/20030705005208/ http://news.harmony-centr-al.com/Newp/1998/Rio-PMP300/html (U.S. Appl. No. 11/519,429).
De Herrera, Chris, "Microsoft ActiveSync 3.1" Version 1.02, (Oct. 13, 2000 Downloaded Aug. 16, 2011 From http://www.pocketpcfaq.com/wce/activesync3.1.htm (U.S. Appl. No. 11/519,429).
Compaq Computer Corp., copyright 1991, Personal Jukebox User Manual, pp. 1-29. (U.S. Appl. No. 11/519,429).
Compaq Computer Corp., "Systems Research Center and PAAD," Personal Jukebox (PJB), 25 pgs, Oct. 13, 2000 (downloaded from http://research.compaq.com/Src/pjb/; redownloaded Apr. 2016 from hftp://birrell.org/andrew/talks/pjb-overview.pdf).
Compaq Computer Corp., "Personal Jukebox," 2 pgs, Jan. 24, 2001 (downloaded from http://research.compaq.com/SRC/pjb/).
Chakarova et al., "Digital Still Cameras, Downloading Images to a Computer," Multi-Media Reporting and Convergence, 2 pgs., 2014.
Butler, "Portable MP3: The Nomad Jukebox," Aug. 1, 2001 (http:lldb.tidbits.com/getbits.acgi?tbart=06261, downloaded Jul. 13, 2011 from http://www.tidbits.com/article/6261).
Butler, "Archos Jukebox 6000 Challenges Nomad Jukebox," 6 pgs, Aug. 13, 2001 (from http://db.tidbits.com/getbits.3Ggi?tbart=06521 (downloaded Jul. 13, 2011 from http://www.tidbits.com/article/6521?print version=1).
Bridgman, "Windows XP Expert Zone Community Columnist", Using Windows Mobile-based Portable Media Centers and Windows Media Player 10, Aug. 25, 2004, 1-11. (U.S. Appl. No. 11/519,429).
Bott, "Special Edition Using Microsoft 1-18 Windows Millennium Passage", Special Edition Using Microsoft Windows Millennium Edition, Nov. 3, 2000, pp. 1-24. (U.S. Appl. No. 11/519,429).
Awbrey, "Apple's iPod Available in Stores Tomorrow," Press Release, Nov. 9, 2001 (downloaded Jul. 14, 2011 from http://www.apple.com/pr/library/2001/11/09Apple-s-iPod-Available).
Apple Inc., "iTunes, Playlist Related Help Screens," iTunes v1.0, 8 pgs, Jan. 2001.
Apple Inc., "Apple-Downloads-Dashboard", http://www.apple.com/downloads/dashboard, downloaded Dec. 16, 2008, pp. 102 (U.S. Appl. No. 11/519,429).
Apple Inc. "Apple Introduces iTunes—World's Best and Easiest to Use Jukebox Software," MacWorld Expo, San Francisco, 2 pgs, Jan. 9, 2001 (https://www.apple.com/pr/library/2001/01/09Apple-Introduces-iTunes-Worlds-Best-and-Easiest-To-Use-Jukebox-S.
Apple Announces iTunes 2, Press Release, Apple Computer, Inc., dated Oct. 23, 2001 http://www.apple.com/pr/library/2001/10/23Apple-Announces-iTunes-2.html] downloaded Apr. 8, 2012 (U.S. Appl. No. 11/519,429).
Andy Lindauer, "What's in you Pocket?," Edgereview, downloaded Jan. 25, 2002, http://www.edgereview.com/print.cfm?Type+aag&Id=286 (U.S. Appl. No. 11/519,429).
Andrew Birrell, "Personal Jukebox (PJB)," Oct. 13, 2000 available from http://birrell.org/andrew/talks/pjb-overview.ppt. U.S. Appl. No. 11/519,429).
Alicia Awbrey, press release entitled "Apple's iPod Available in Stores Tomorrow," Nov. 9, 2001 [downloaded Jul. 14, 2011 at http://www.apple.c.om/prilibrary/2001/11/09Apple-s-iPod-Available] (U.S. Appl. No. 11/519,429).
Adam C. Engst. "SoundJam Keeps on Jammin'." Jun. 19, 2000, available from http://db.tidbits.com/getbits.acgi?tbart=05988. downloaded Jul. 25, 2011 at http?..db.tidbits.com/article/5988?print?version+1 (U.S. Appl. No. 11/519,429).
AccelerateYourMac.com, Apple posts Automated Scripts for iTunes 2.03, 9 pgs, 2001 (downloaded Apr. 11, 2012 from http://www.x1r8yourmac.com/archive/dec01/121801.html).
About MusicMatch Jukebox, MusicMatch Jukebox v4 Help. pp. 1-4, (1999) (U.S. Appl. No. 11/519,429).

\* cited by examiner

NETWORKED MEDIA STATION

RELATED APPLICATION

The instant application is a continuation of, and hereby claims priority to, pending U.S. patent application Ser. No. 10/862,115, which is titled "Networked Media Station," by inventors Philip F Kearney III, Robert Dale Newberry, Jr., Jeffrey L. Robbin, David Heller, Christopher R. Wysocki and Stephen Anderson Davis, which was filed on 4 Jun. 2004, and which is incorporated by reference.

BACKGROUND

With the increasing capacity and capability of personal computers, as well as improved multimedia interfaces for these computers, it has become popular to use personal computers as a repository for multimedia content, such as songs, movies, etc. Particularly with music, the increased popularity of storing multimedia information on a personal computer has resulted in a variety of products and services to serve this industry. For example, a variety of stand-alone players of encoded multimedia information have been developed, including, for example, the iPod, produced by Apple Computer of Cupertino, Calif. Additionally, services have been developed around these devices, which allow consumers to purchase music and other multimedia information in digital form suitable for storage and playback using personal computers, including, for example, the iTunes music service, also run by Apple Computer.

These products and services have resulted in an environment where many consumers use their personal computer as a primary vehicle for obtaining, storing, and accessing multimedia information. One drawback to such a system is that although the quality of multimedia playback systems for computers, e.g., displays, speakers, etc. have improved dramatically in the last several years, these systems still lag behind typical entertainment devices, e.g., stereos, televisions, projection systems, etc. in terms of performance, fidelity, and usability for the typical consumer.

Thus, it would be beneficial to provide a mechanism whereby a consumer could easily obtain, store, and access multimedia content using a personal computer, while also being able to listen, view or otherwise access this content using conventional entertainment devices, such as stereo equipment, televisions, home theatre systems, etc. Because of the increasing use of personal computers and related peripherals in the home, it would also be advantageous to integrate such a mechanism with a home networking to provide an integrated electronic environment for the consumer.

In addition to these needs, there is also increasing interest in the field of home networking, which involves allowing disparate devices in the home or workplace to recognize each other and exchange data, perhaps under the control of some central hub. To date a number of solutions in this area have involved closed systems that required the purchase of disparate components from the same vendor. For example, audio speaker systems that allow computer-controlled switching of music from one location to another may be purchased as a system from a single vendor, but they may be expensive and/or may limit the consumer's ability to mix and match components of a home network from different vendors according to her own preferences. Thus it would be beneficial to provide a mechanism by which various home networking components from differing vendors can nonetheless interact in a home network environment.

SUMMARY

The present invention relates to a networked media station. A networked media station as described herein provides a novel combination of a variety of features. This functionality is provided by integrating several interfaces and feature sets into an integrated platform, including a wireless network interface, a wired network interface, a peripheral interface, and a multimedia interface.

The wireless network interface, e.g., 802.11b or 802.11g, allows the multimedia station to communicate wirelessly with other devices and to serve as a wireless base station (for setting up a wireless network) or as a repeater (for a preexisting wireless network). The wireless network interface, in conjunction with the wired network interface, e.g., an Ethernet interface, allows the networked media station to serve as a bridge between a wireless and a wired network. To accomplish these tasks, the wireless multimedia device is equipped with switching and or routing logic.

The peripheral interface, e.g., a USB interface, may be used to allow the networked media station to communicate with a variety of peripherals. In conjunction with the wireless and/or wired network interface, this allows sharing of a single peripheral, e.g., a printer, among multiple networked computers.

The multimedia interface, e.g., an audio and/or video interface, may be used to allow the networked media station to be used in conjunction with entertainment devices, such as a stereo system, television, or home theatre system. This would allow, for example, streaming of multimedia information from a computer connected to the networked media station via wired or wireless network to an entertainment device connected to the multimedia interface. Additionally, control of certain aspects of the multimedia playback may preferably be controlled from and/or indicated at a network connected computer. Additionally, the multimedia interface may include input interfaces that act as the collection point for multimedia data to be communicated to a peer device, for example, for display on the computer.

The invention further relates to the ability to use the networked media station as a basic building block for an extensible, highly customizable home network solution. The networked media station can publish to a connected computer or other peer device the capabilities of connected entertainment devices or input devices. In this way, a user of the computer, for example, may be able to select from a number of destinations throughout, for example, a house, for delivering multimedia content or receiving multimedia input.

Another aspect of the invention involves a user interface for a computer that permits a computer to automatically detect and display to a user the availability of a multimedia source or destination remotely located at a networked media station.

DETAILED DESCRIPTION

A networked media station is described herein. The following embodiments of the invention, described in terms of devices and applications compatible with computer systems manufactured by Apple Computer, Inc. of Cupertino, Calif., are illustrative only and should not be considered limiting in any respect.

Figure 1:
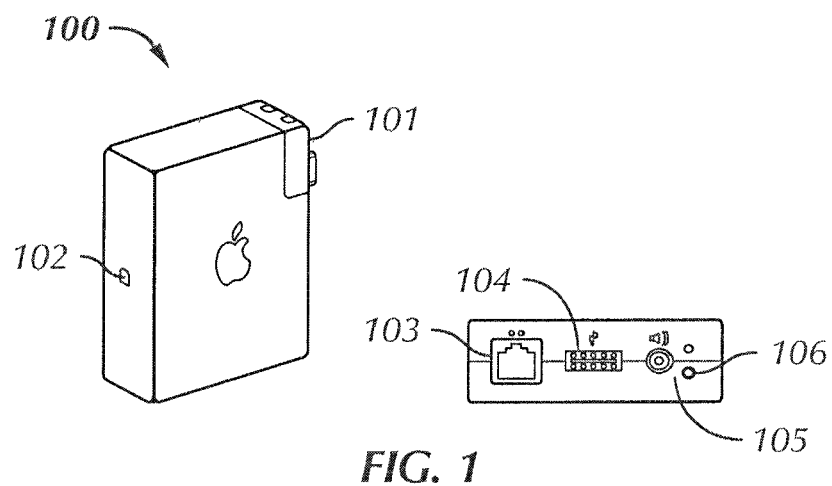
FIG. 1 illustrates an oblique side view and a bottom view of a networked media station embodying various teachings of the present disclosure.

An exemplary networked media station 100 is illustrated in FIG. 1, which shows an oblique side view and a bottom view of the networked media station. The networked media station 100 includes an AC power adapter 101, more fully illustrated in FIG. 9 below. A status light 102 provides indication of the status of the networked media station to a user. Status light 102 is preferably a light emitting diode (LED), and more preferably a combination of LEDs integrated into a single package to allow illumination in different colors, e.g., green, red, and/or amber/yellow. Various status light indications are described more fully below.

With reference to the bottom view of networked media station 100 illustrated in FIG. 1, networked media station 100 includes a wired network interface 103, a peripheral interface 104, and a multimedia interface 105. As illustrated, wired network interface 103 is an Ethernet interface, although other wired network interface types could be provided. Similarly, peripheral interface 104 is illustrated as a USB interface, although other peripheral interfaces, such as IEEE 1394 ("Firewire"), RS-232 (serial interface), IEEE 1284 (parallel interface) could also be used. Likewise multimedia interface 105 is illustrated as an audio interface including both analog line out and optical digital audio functionality. However, other multimedia interfaces, such as a video interface using composite video, S-video, component video, etc. could also be provided. As illustrated and described herein, multimedia interface could be an output interface for outputting multimedia content received by the networked media station. Alternatively, the multimedia interface could be an input interface for sending multimedia content to a destination on one of the other interfaces.

Although only one interface of each type is illustrated, multiple interfaces of one or more of the identified types could be provided. Alternatively, only a subset of the identified interfaces might be provided, or additional types of interfaces could be provided. In any case, the interfaces illustrated should be considered exemplary, as one skilled in the art would understand that a variety of interfaces, including interfaces not specifically mentioned herein, could advantageously be provided.

Another interface, wireless networking, is not illustrated in FIG. 1, but is also preferably provided in the networked media station 100. The wireless network interface preferably takes the form of a "WiFi" interface according to the IEEE 802.11b or 802.11g standards. Other wireless network standards could also be used, either in alternative to the identified standards or in addition to the identified standards. Such other network standards could include the IEEE 802.11a standard or the Bluetooth standard. The antenna required for wireless networking is not illustrated in FIG. 1, but is preferably included within the housing of networked media station 100. Such an antenna may take a variety of forms, but is preferably an antenna printed on a standard PCB (printed circuit board). Such antennas are well known to those skilled in the art. However, it would also be possible to include some form of external antenna on the exterior housing of networked media station 100 and/or to provide an additional interface for an external antenna.

A reset button 106 is also illustrated in FIG. 1, which may be used to reset the device for troubleshooting purposes. Also, it should be noted that the form factor of the networked media station is preferably such that the device is easily portable so that it may be used in a variety of locations.

Figure 9:
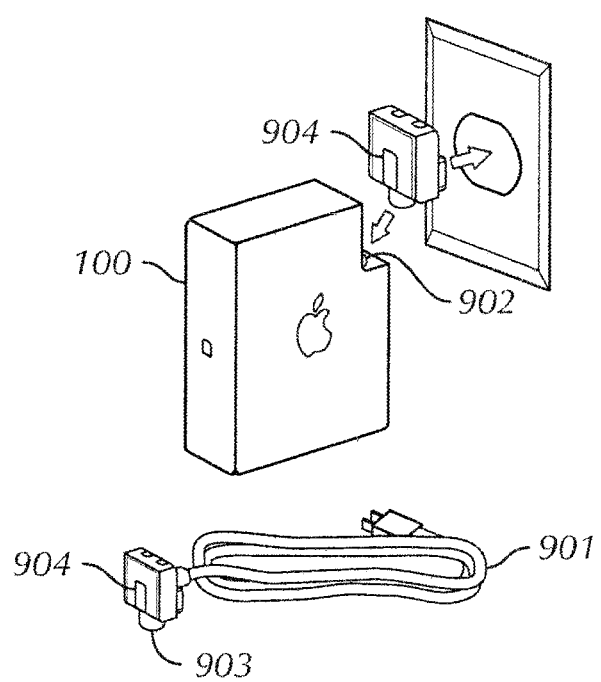
FIG. 9 illustrates the configuration of an AC power connector of a networked media station embodying certain teachings of the present disclosure.

One aspect particularly advantageous to providing the required portability is the AC power adapter 101 illustrated in FIG. 9. As can be seen in FIG. 1, the power adapter may be connected directly to networked media station 100 so as to form an essentially integrated assembly. Additionally, the power prongs may fold into the casing for networked media station 100. Alternatively, the power adapter may be removed from direct physical contact with the body of networked media adapter 100 and may instead be plugged into a wall socket and connected via power cord 901 to the networked media station. This allows the body of networked media adapter 100 to be located somewhat independently of the location of the AC power source, i.e. wall socket.

By inspection of FIG. 9, the features for interlocking AC power adapter 101 with the body of networked media adapter 100 may be more readily viewed. In general, the body of networked media adapter 100 includes power connection 902, which is adapted for receiving a power cord having a complementary connector 903. This connector may, for example, be designed so that the power can only be connected with a desired polarity. The body of networked media adapter 100 also includes a mechanical interface (not shown) in addition to the power connector 902 for mechanically attaching the power adapter separate from the electrical connection. In one embodiment, this mechanical interface takes the form of a stud, which has a complementary slot 904 in AC adapter 101, although other forms of complementary mechanical interfaces could also be provided.

As noted above, a status light 102 is provided, which is used to indicate the current status of the networked media station to the user. In one embodiment, this light may be off to indicate that the device is not powered. The light may flash in a particular color, e.g., green, to indicate that it is powering up and/or going through a startup/self-diagnostic routine. The light may illuminate in a solid color, e.g., green to indicate that it is on and functioning properly. The light may also illuminate or flash in a different color, e.g., yellow, to indicate that a problem exists, such as no wireless devices in range or no network signal.

Figure 2:
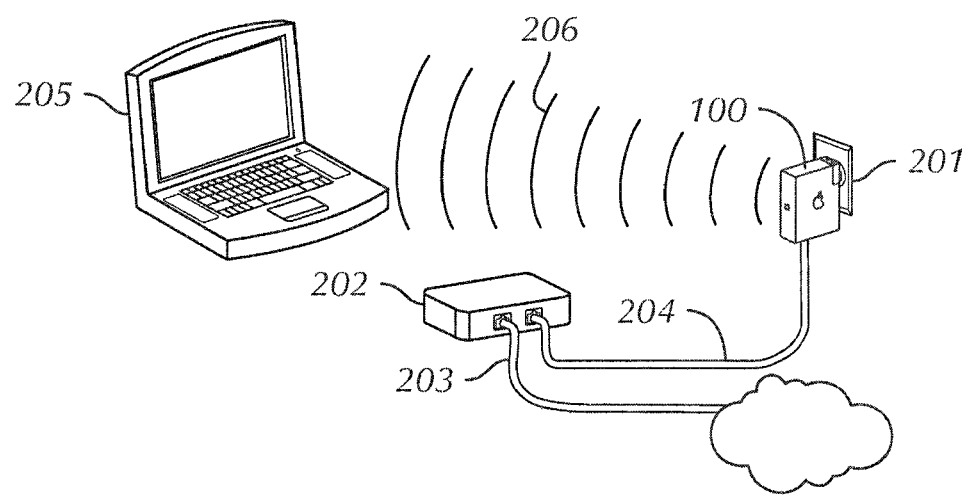
FIG. 2 illustrates a basic network connection using the networked media station of FIG. 1 to wirelessly connect a personal computer to the Internet.

A networked media station in accordance with the present invention may be configured in different ways to perform specific functions. One example is to use the networked media station as a wireless access point to provide wireless network connectivity to one or more computer devices sharing a common wired network connection, which may be, for example, a broadband Internet connection. Such a configuration of networked media station 100 is illustrated in FIG. 2. The networked media station 100 is plugged into wall socket 201, which provides power to the device. The networked media station is connected via Ethernet cable 204 to DSL or cable modem 202. DSL or cable modem 202 is connected to the Internet via wire 203. A personal computer 205 is in communication with the networked media station 100 by wireless network 206. Although described in terms of a shared broadband Internet connection, the configuration illustrated in FIG. 2 need not be so limited. The connection to the wired network port of the networked media station (via line 204) could come from any wired network device, such as a switch, router or gateway, and could connect to a LAN (local area network), a WAN (wide area network), or the Internet (as illustrated).

In this configuration, the networked media station essentially acts as a hub to interconnect computers, e.g., personal computer 205 and its peers (not illustrated) on the wireless network 206. Additionally, the networked media station may act as a DHCP (dynamic host configuration protocol) server to provide addresses to the devices on the wireless network 206, such as personal computer 205. The networked media station may also act as a DHCP client to obtain an IP address from another DHCP server on the wired network to which it is connected. In such a configuration, networked media station 100 will act as a bridge/router to transmit packets received from the wired network to the appropriate recipient on wireless network 206 and vice versa. Networked media station 100 also preferably provides some level of security, such as firewall functionality and/or network address translation. Implementations of such functionality are known to those skilled in the art, thus various implementation details are not repeated here.

It will be appreciated that the compact and integrated design described herein is particularly useful, for example, for a business traveler who wants to connect to a network, such as the Internet, from a hotel or conference room but does not want to be physically located near an available power and/or wired network connection. Such a business traveler could plug the networked media station 100 into a wall socket and wired network access point, and then be free to use a wireless enabled laptop computer or other device anywhere within range of the wireless network created thereby. When finished, the user can simply unplug the device and stow it away in a briefcase or pocket.

Figure 3:
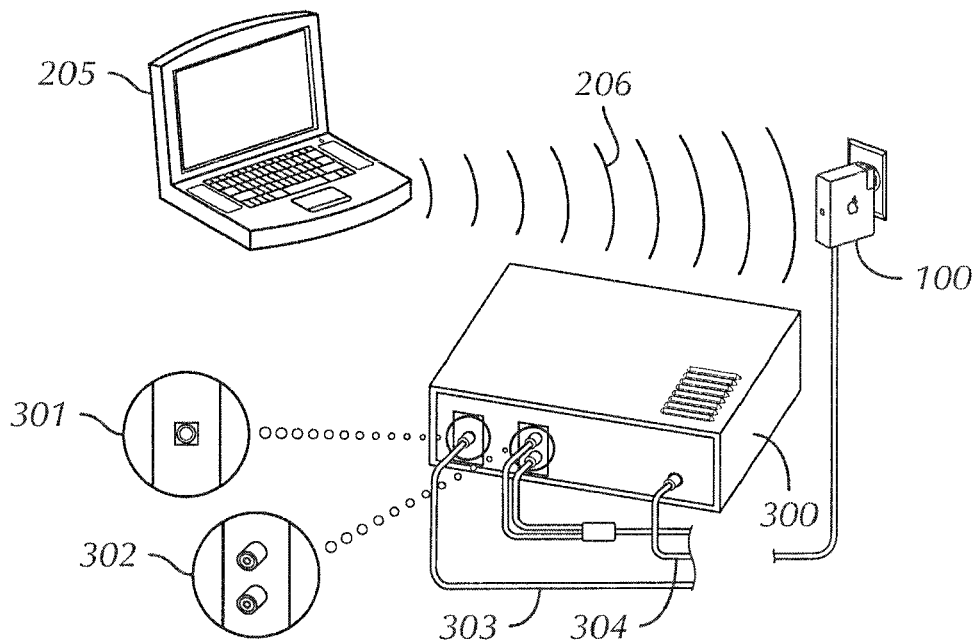
FIG. 3 illustrates a variation of the network connection of FIG. 2 in which the networked media station is connected to an entertainment device (stereo receiver) to enable multimedia content stored on a personal computer to be sent to the entertainment device over the network.

Additionally, the networked media station described herein may also be used to play multimedia content from a personal computer, e.g., audio files, on an entertainment device, e.g., a stereo system. Such a configuration is illustrated in FIG. 3. Networked media station 100 is plugged into a wall outlet for power. The networked media station acts as a wireless base station for wireless network 206 as described above with reference to FIG. 2, thus enabling computer 205 to communicate with the networked media station 100. The networked media station 100 is also connected to stereo receiver 300 to enable playback of audio files stored on computer 205 on a stereo system. The connection between networked media station 100 and stereo receiver 300 may be by way of line level audio connection or digital fiber optic connection. Either connector plugs into the multimedia port 105 (FIG. 1), which is a dual purpose analog/optical digital audio mini-jack. To interface with stereo receiver 300, a mini stereo to RCA cable adapter cable 304 is required, which will connect to RCA-type right and left audio input ports 302 on the stereo receiver. Alternatively a Toslink digital fiber optic cable 303 may be used, which would connect to digital audio input port 301 on stereo receiver 300.

Figure 4:
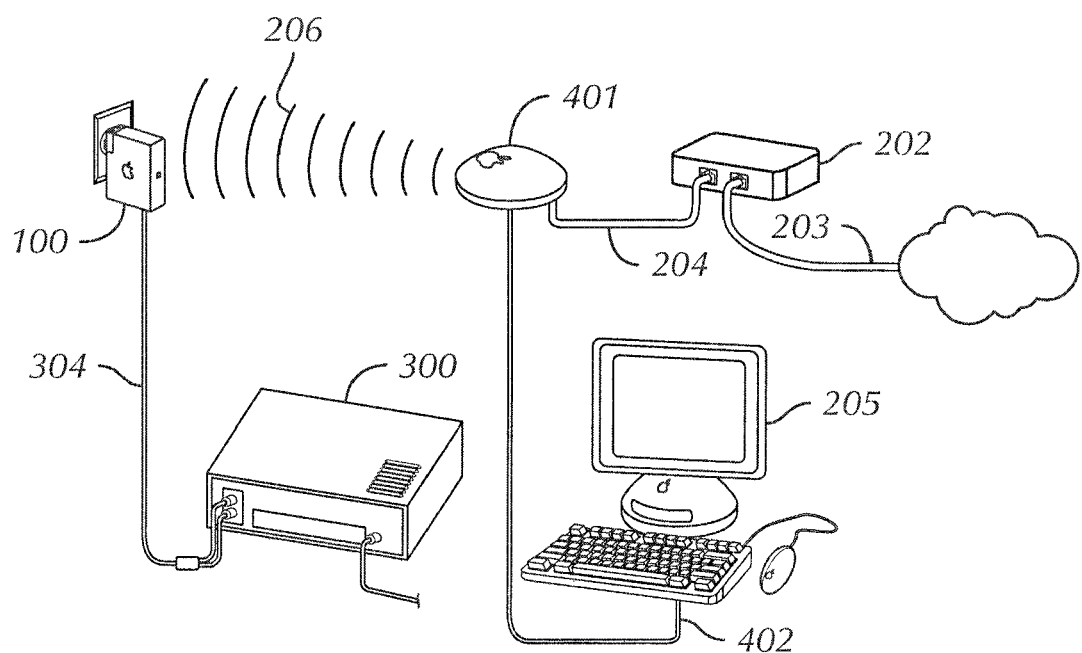
FIG. 4 illustrates a variation of the network of FIG. 3 in which the personal computer is connected to a wired network that is wirelessly bridged to the networked media station and its connected media device.
Figure 5:
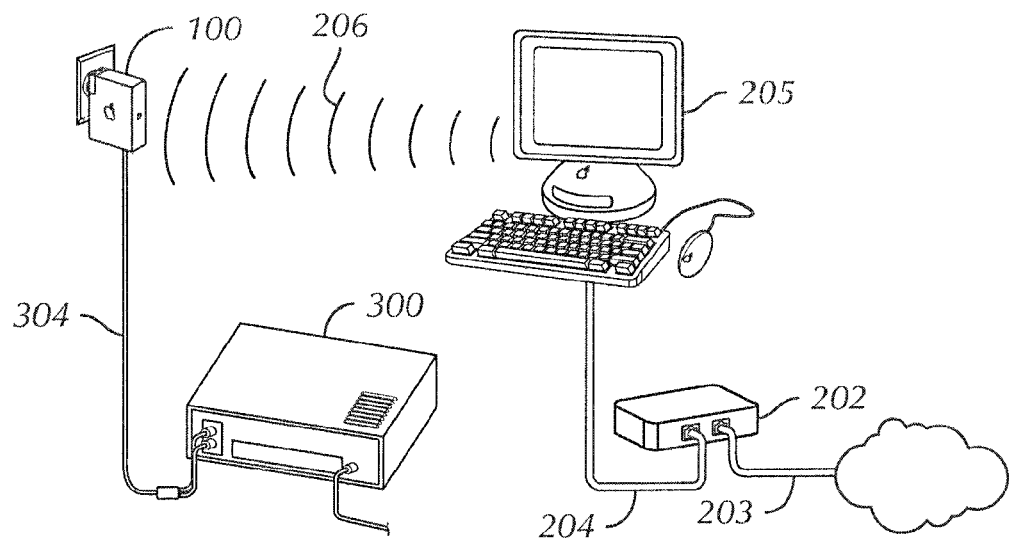
FIG. 5 illustrates yet another variation of the network of FIG. 3 in which multimedia content may be transferred wirelessly from a personal computer to a networked media station and output on an entertainment device connected thereto.
Figure 6:
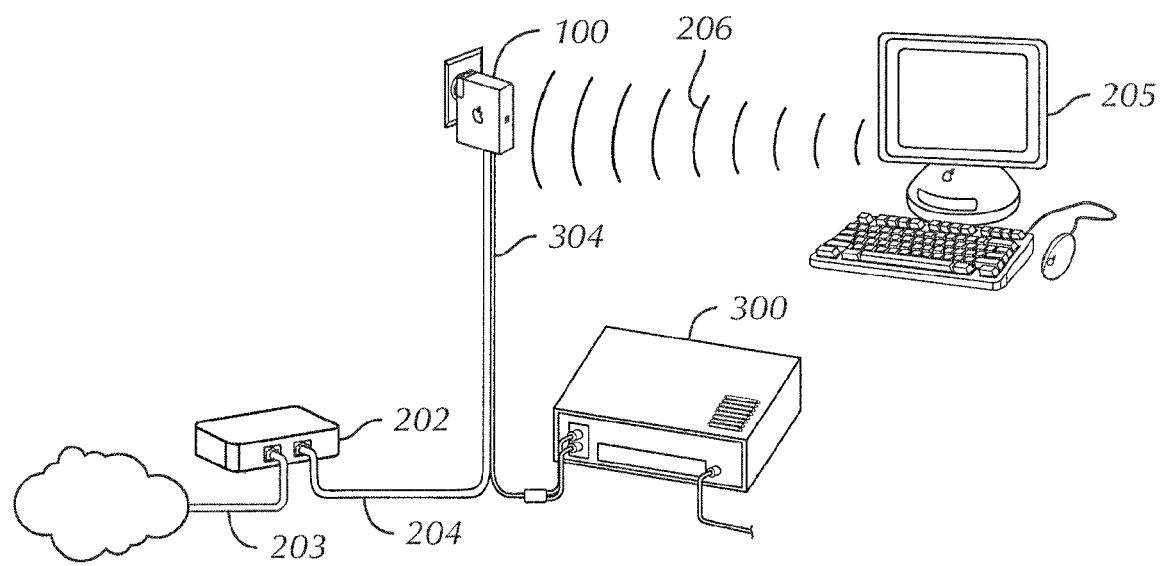
FIG. 6 illustrates still another configuration for network connection sharing and multimedia content distribution using a networked media station embodying various teachings of the present disclosure.

Various media sharing configurations using networked media station 100 are illustrated in FIGS. 4-6, where like reference numerals are used to FIGS. 1-3. In FIG. 4 personal computer 205 is equipped with an Ethernet port that is connected via connection 402 to base station 401. Base station 401 may be any variety of access point, and preferably includes wireless access, routing, switching and firewall functionality. Base station 401 is connected via cable 204 to DSL or cable modem 202, which receives an Internet connection through connection 203. This portion of the system is similar to that depicted in FIG. 2 and described above. Using such a system, multimedia files stored on computer 205 may be played using stereo receiver 300, which is connected to networked media station using the audio interface. Communication between computer 205 and the networked media station 100 connected to stereo receiver 300 is via a wired network segment (illustrated schematically by connection 402) and a wireless network segment 206. FIGS. 5 and 6 depict other alternative connection arrangements, which are variations of the above.

Figure 7:
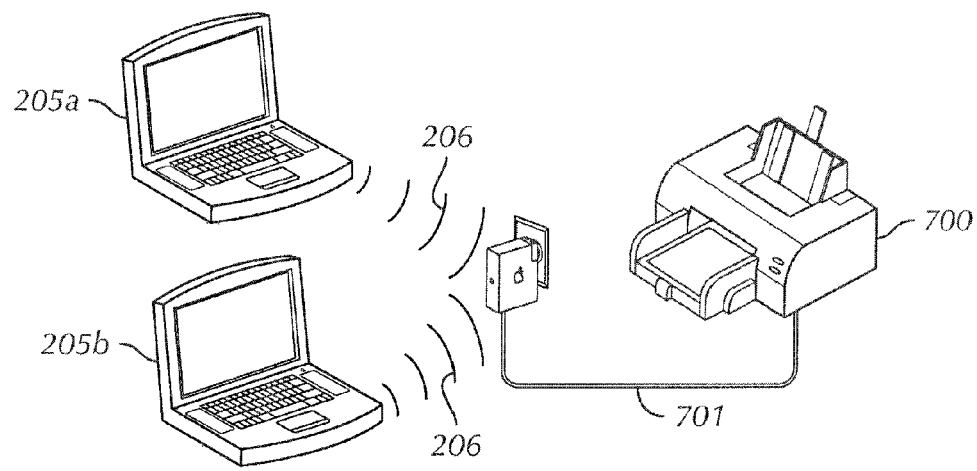
FIG. 7 illustrates a configuration of networked media station for sharing a peripheral attached to the networked media station with a plurality of computers attached to the networked media station via the network.

Yet another feature preferably supported by networked media station 100 is peripheral sharing, as illustrated in FIG. 7. Printer 700 is connected by connection 701 to the peripheral port 104 (FIG. 1), which in one embodiment is a USB port, although other types of peripheral ports may also be used. Personal computers 205a and 205b are interconnected by wireless network 206, which is set up by networked media station 100. This wireless network allows both computers to use printer 700, and also allows for file sharing between the two computers. Although described in terms of printer sharing, it would be possible to share other types of peripherals as well, including, for example, cameras (still or video), storage devices, scanners, handheld devices of various types, etc. In particular, it should also be noted that peripherals requiring bi-directional communication, may also be shared. Implementation details necessary to enable sharing of such peripherals among a plurality of computers connected on a network are generally known to those skilled in the art, and, as such, are not repeated here.

Figure 8:
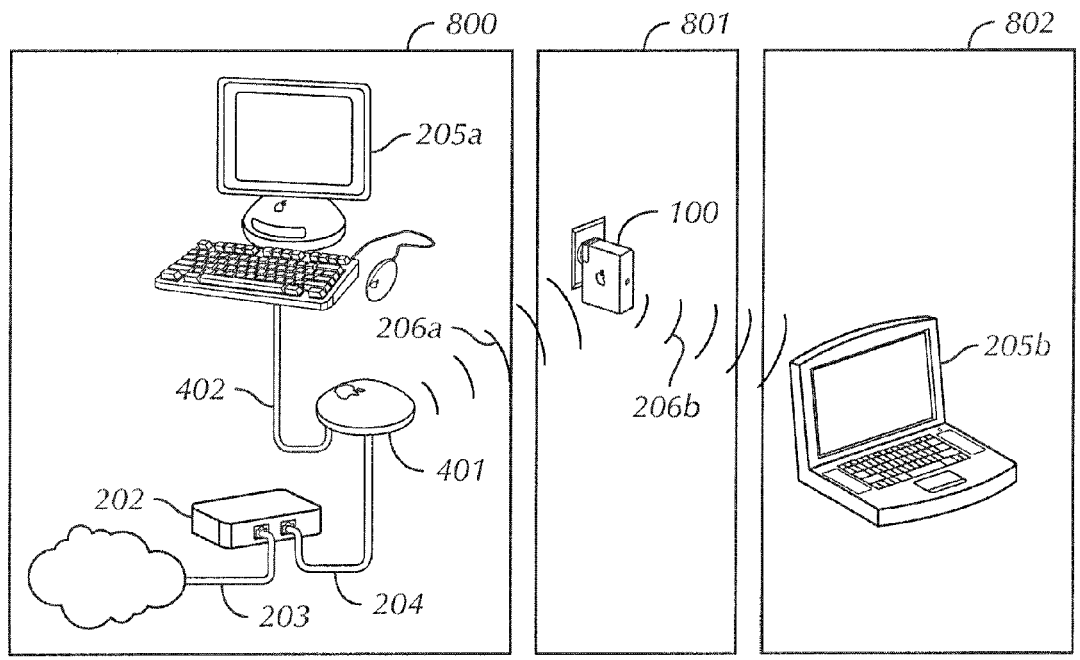
FIG. 8 illustrates another possible configuration in which a networked media station embodying various teachings of the present disclosure is used to extend the range of a wireless network.

Still another desirable feature of networked media station 100 is illustrated in FIG. 8, which is extending the range of an existing wireless network. Schematically depicted in FIG. 8 are three rooms, for example, in a typical house. In family room 800 a network arrangement similar to that described above with reference to FIG. 4 is set up. In living room 802 a user wishes to connect to the Internet or use other network resources; however, this room may be beyond the range of wireless network 206a set up by base station 401. By locating networked media station 100 in an intermediate room 801, the range of the wireless network may be extended (206*b*) enabling personal computer 205*b* to access network resources that would otherwise be out of range. This interconnectivity is preferably provided using a Wireless Distribution System (WDS) as specified by the IEEE 802.11 standard.

As briefly described above, one novel feature of networked media station 100 is the ability to receive multimedia information from a computer over a network connection and output this media information to an entertainment device. Although it is contemplated that audio, video, audio/video, and/or other forms of multimedia may be used with the networked media station described herein, one exemplary embodiment relates to the sharing of audio data stored on a personal computer with an entertainment device, such as a stereo system. One such configuration was described above with respect to FIG. 3. The following is a description of various implementation details of such a system implemented using hardware and software developed by Apple Computer. Although certain details are somewhat specific to such an implementation, various principles described are also generally applicable to other forms of hardware and/or software.

Figure 10:
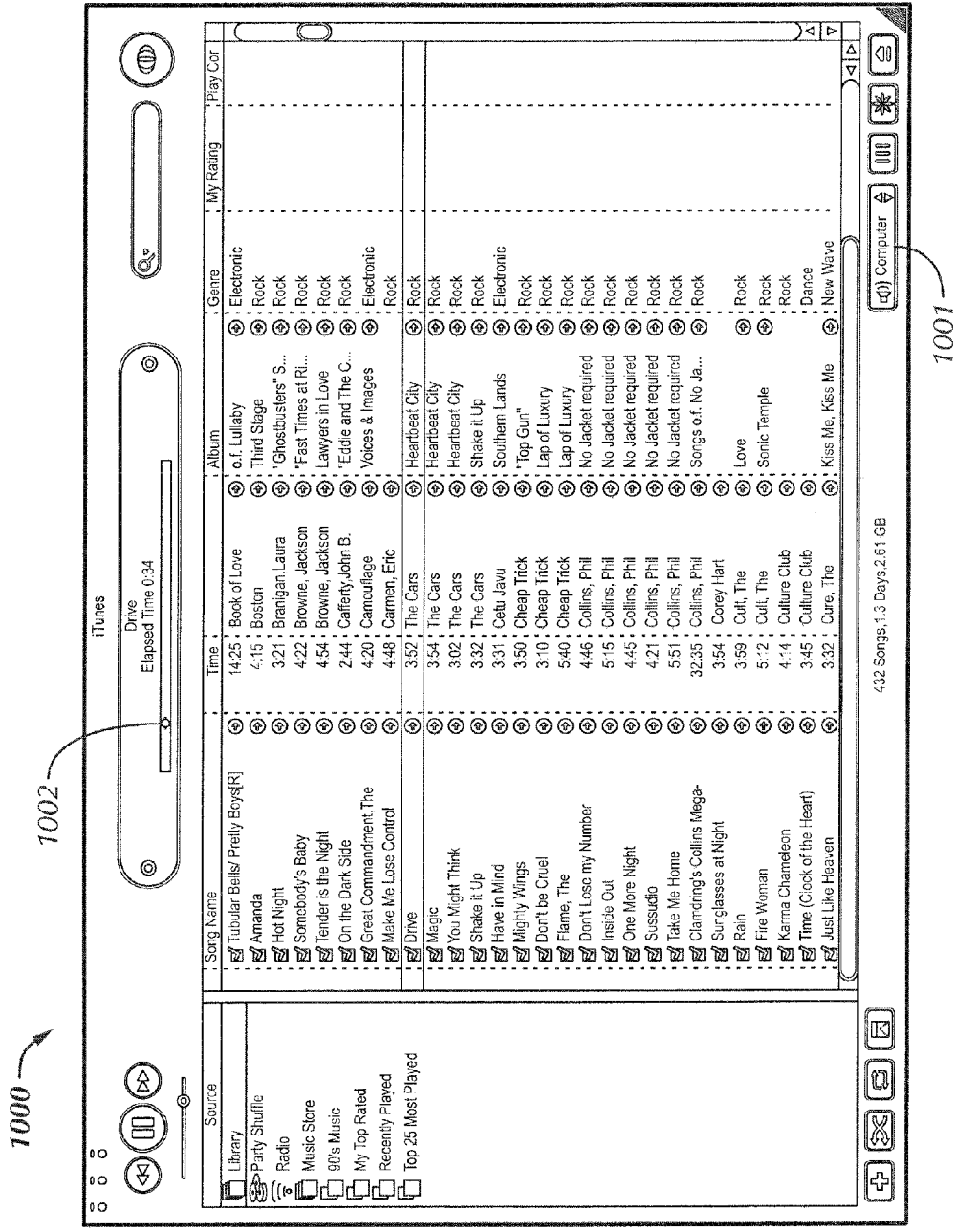
FIG. 10 illustrates a screen image of an exemplary software interface to a networked media station embodying various teachings according to the present disclosure.

To provide a relatively simple and user friendly interface to the media sharing features of networked media station 100, it is advantageous to provide access to the device from a media application running on the personal computer 205, which is also preferably the application normally used to create, manipulate, or otherwise access the particular type of media file. In one exemplary embodiment, this could be the iTunes software for music file management and playback produced by Apple Computer. In the iTunes interface screen 1000, illustrated in FIG. 10, the networked media station may be selected as a destination for media playback using icon 1001. The system can be programmed such that the audio content of the media file will be sent to the networked media station 100, while system sounds (e.g., beeps, alerts, etc.) will continue to be played back on personal computer 205 using the system speakers.

Interface between the personal computer 205 and portable media station 100 over the network (e.g., wireless network 206) is initiated through a discovery process. One example of such a discovery process uses Rendezvous, which is a technology that enables automatic discovery of computers, devices, and services on IP networks. Also known as Zero Configuration Networking, Rendezvous uses standard IP protocols to allow devices to automatically find each other without the need for a user to enter IP addresses or configure DNS servers. Various aspects of Rendezvous are generally known to those skilled in the art, and are disclosed in the white paper entitled "Rendezvous" dated October, 2003, and published by Apple Computer, which is hereby incorporated by reference in its entirety. Additional implementation details may be found in the following co-pending patent applications, commonly owned with the present application, which are hereby incorporated by reference in their entirety: "Method and Apparatus for Configuring a Wireless Device Through Reverse Advertising," Ser. No. 10/102,321, filed Mar. 19, 2002; "Method and Apparatus for Supporting Duplicate Suppression When Issuing Multicast DNS Queries Using DNS_Format Message Packets," Ser. No. 10/102,174, filed Mar. 19, 2002; and "Method and Apparatus for Implemented a Sleep Proxy for Services on a Network," Ser. No. 60/496,842, filed Aug. 20, 2003.

To provide the media sharing functionality described herein, networked media station 100 will advertise over the network that it supports audio streaming. As required for standard Rendezvous operation, the networked media station will publish the availability of a service, the name of the device providing the service, the network address of the device, and one or more configuration parameters that are related to the service. In case of audio file playback on a remote device, the service provided would be newly defined Rendezvous service _raop._tcp ("remote audio output protocol"). The registration of this service advertises particular audio capabilities of the system (e.g., 44.1 kHz sample rate, 16-bit sample size, and 2-channel/stereo samples). The registration of the service might also include security, encryption, compression, and other capabilities and/or parameters that are necessary for communicating with the device.

In alternative embodiments, additional services may be designed to specify a variety of parameters relating to one or more multimedia input or output devices attached to the portable media station. Devices that might have particular applicability in a home network environment include speakers, video display terminals, cameras, microphones, etc. For example, a variety of input devices interfaced into one or more networked media stations could provide the basis for a home security system (using cameras, motion detectors, microphones, etc.)

The automatic discovery aspects of the present invention permit its use in architecting easily configured home networks according to a user's preferences and designs. For example, a user with a large library of music on a computer in one room of a house can create a wireless multimedia network for his entire home simply by deploying a few of the disclosed networked media stations throughout his home. For example, he can put one near the stereo in the living room, and one by the television in the bedroom. By connecting the appropriate multimedia interface, he can serve audio, video, or other content to these devices with a simple selection at his computer. For example, he may direct the living room stereo to play his favorite album, and he may direct the bedroom television to show a home movie. This extensible architecture allows a user to configure relationships between sources and destinations of media data without regard for buying all components from the same vendor, or other such considerations that might otherwise be required to permit interoperability of disparate devices on a wireless network.

The media software running on personal computer 205, e.g., iTunes, will discover the networked media station 100 via the Rendezvous records, will recognize this device as a destination for audio data, and will automatically provide the particular device as a selectable destination within the user interface. (See FIG. 10, reference numeral 1001.) When the user selects a particular networked media station 100 from those available, a variety of authentication and security exchanges will take place. For example, if password protection is provided as a security feature, the user may be prompted for a password required to use networked media station 100 for audio file playback. Additionally, if the user attempts to select a device that is already in use (for example, by another user), the networked media station will send a message indicating that it is busy through the user interface.

Another aspect of the present invention relating to a device already in use relates to the connection teardown procedure that may be implemented in accordance with the present invention. Once a connection is established between a media source, e.g., a personal computer, and the networked media station, the connection remains open so long as media data is being transmitted. Once media data is no longer being transmitted, for example, at the end of playback of a song or album, the connection enters an "idle" state. While in this idle state, the media source can begin successfully transmitting data at any time, as the connection has not been torn down. Thus it would not be necessary to renegotiate or otherwise reestablish the connection.

However, while the networked media station has a connection in this "idle" state, it will also accept an attempt to establish a connection with another media source. If such an attempt occurs, the connection with the first source will be torn down and a new connection will be established. Preferably the first source will also be notified that its connection has been terminated.

Additionally, for digital rights management purposes, it may be desirable to determine that networked media station 100 is authorized to receive an audio data stream and/or that the communications link between the personal computer and the networked media station is secure (encrypted). This requires some form of authentication, and is preferably based on a public key/private key system. In one embodiment, each networked media station 100 may be provided with a plurality of private keys embedded in read only memory (ROM). The media software is then provided with a corresponding plurality of public keys. This allows identification data transmitted from the networked media station 100 to the media software to be digitally signed by the networked media station using its private key, by which it can be authenticated by the media software using the appropriate public key. Similarly, data sent from the media software to the networked media station may be encrypted using a public key so that only a networked media station using the corresponding private key can decrypt the data. The media software and networked media station may determine which of their respective pluralities of keys to use based on the exchange of a key index, telling them which of their respective keys to use without the necessity of transmitting entire keys.

It is preferable that authentication of a networked media station 100 occur upon initial establishment of a connection to the media software. Upon successful authentication, the media software running on personal computer 205 will open a network connection to the networked media station's audio channel and begin sending data. It is notable that data is "pushed" from the media software to networked media station rather than being "pulled" by the networked media station from the media software. The networked media station receives this audio data, buffers some portion of the data, and begins playing back the audio data once the buffer has reached a predetermined capacity. For example, the networked media station may have a total of 8 seconds of buffering, but may begin playback when 2 seconds of audio data have been received. Additionally, it is also possible for the buffer to have a varying capacity, determined, for example, by network traffic or reliability conditions.

In a preferred embodiment, the audio channel is separate from the control channel, i.e., the channel used to set up the connection. For reasons explained below, it is advantageous to have the data channel separate from the control channel. However, a single channel could be used for data and control information.

One advantage to using separate control and data channels is improved response to user commands. As noted above, networked media station 100 includes buffering of data, which compensates for network delays, latency, etc. If control commands are included in the data stream, these commands would not be reached until the networked media station played through the buffer, meaning there would be a delay of up to several seconds before implementing the user command. This is obviously undesirable, and thus a separate channel for control data provides an enhanced user experience.

The packets sent over the data channel (in this example the audio data) are preferably TCP packets in the general form specified by the real time streaming protocol (RTSP) standard. RTSP is a standard communication protocol known to those skilled in the art. Therefore implementation details of such a system are not discussed here, although they may be found in Real Time Streaming Protocol Specification dated Feb. 16, 2004, and prior versions, presently available from http://www.rtsp.orq and which are hereby incorporated by reference in their entirety. Additionally, although TCP (transmission control protocol) is preferably used because of its robustness, UDP (user datagram protocol) may also be used, particularly in applications where the overhead associated with TCP would be undesirable.

In either case, the data packets will use RTP (real time protocol) headers, and will include both sequence numbers and time stamp information. However, when TCP is used, this sequence and time stamp information is not required for detecting missing packets or reordering packets because TCP automatically provides guaranteed packet delivery and correct sequencing. However, the timing and sequence information is useful for feedback from the networked media station to the media control software.

For example, the networked media station may periodically provide information about where it is in the playback of the media stream. This may be accomplished by the networked media station's transmitting over the control channel an indication of the packet currently being played back. Alternatively the networked media station may indicate the packet just received as well as the status of the device's buffers. This information is useful to the media software for multiple purposes. For example, if the media software determines that the buffers on the networked media station are low, additional data may be transmitted to the device in faster than real time, to insure that the device's buffers do not become completely empty. This information may also be used by the media software for synchronizing visual effects displayed on the monitor of personal computer 205 with the sound being output from the networked media station. Visual effects to be synchronized with the audio playback may take a variety of forms, including scrubber bar playhead 1002 (FIG. 10), which indicates where in the file audio data is currently being played back from, or various artistic "visualizations," which provide visual effects that are synchronized with the "beats" of the music. In addition, extension of this control channel could allow for control of the entertainment device to be accomplished from elsewhere on the network, for example, a user could adjust the playback volume of a stereo in one room from a personal computer in another part of the house.

Another use for the packet sequence and time stamp information relates to the case in which the networked media station receives an instruction to stop playback and discard all data received up to that point. In such a case, buffering by the networked media station requires that the packets to be discarded be identified, which is most readily accomplished using the sequence and timestamp information.

The data payload of the RTP packets contains the audio information to be played back by the networked media station. In a preferred embodiment, media files may be stored on personal computer 205 in one or more formats, including, for example, MP3 (Motion Picture Expert's Group Layer 3), MC (Advanced Audio Coding a/k/a MPEG-4 audio), WMA (Windows Media Audio), etc. The media software running on the personal computer decodes these various audio formats, eliminating the need for the networked media station 100 to include decoders for multiple formats. This also reduces the hardware performance requirements of networked media station 100. Yet another advantage of performing decoding on the personal computer is that various effects may be applied to the audio stream, for example, cross fading between tracks, volume control, equalization, and/or other audio effects. Many of these effects would be difficult or impossible to apply if the networked media station were to apply them, for example, because of computational resources required.

The decoded audio data is preferably compressed by personal computer 205 before transmission to networked media station 100. This compression is most preferably accomplished using a lossless compression algorithm to provide maximum audio fidelity. One suitable compressor is the Apple Lossless Encoder, which is available in conjunction with Apple's iTunes software. Networked media station 100 does require a decoder for the compression codec used. It is also preferable that the data stream sent from personal computer 205 to the networked media station 100 be encrypted. One suitable form of encryption is AES using a pre-defined key determined as described above.

Figure 11:
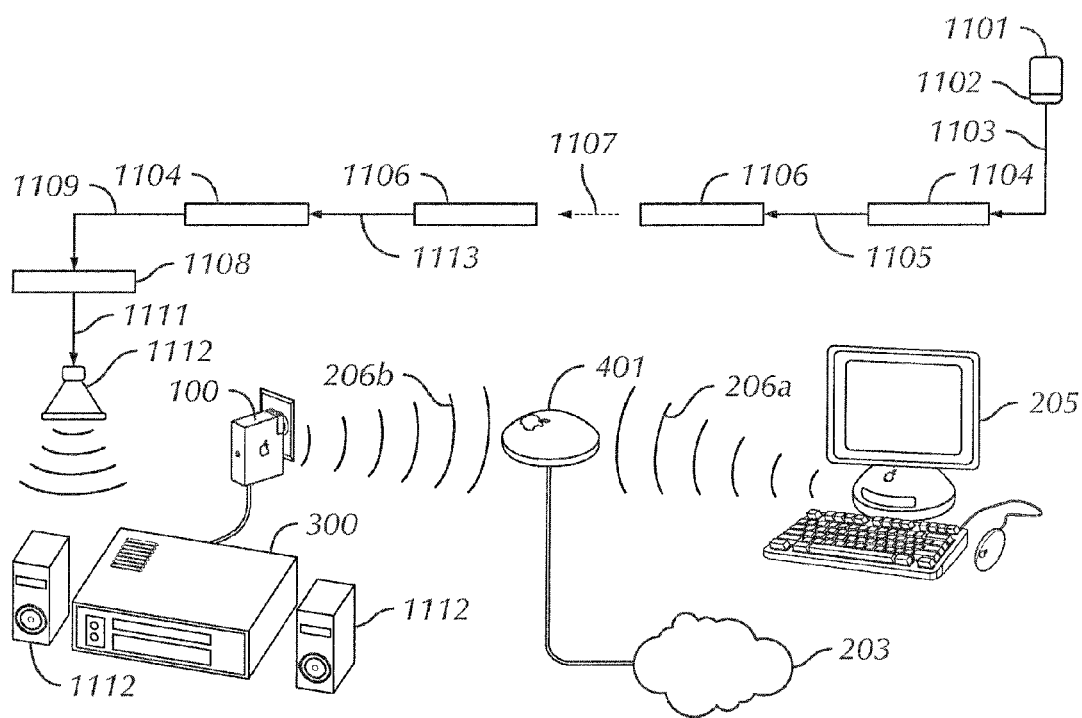
FIG. 11 illustrates the flow of multimedia data in one embodiment of the present invention.

The process of transferring audio data from a network connected computer to an entertainment device using networked media station may be more clearly understood with reference to FIG. 11. Personal computer 205 is connected to a wireless network 206 established by access point 401. Access point 401 also provides for a shared connection to network 203, e.g., the Internet. Networked media station 100 is also connected to the wireless network 206, and has its multimedia port connected to stereo receiver 300, having output speakers 1112.

A digital media file 1101, for example, a song stored in AAC format, is stored on personal computer 205. Once a connection is established between the computer 205 and networked media station 100 and playback is started, a portion 1102 of the media file is transcoded in step 1103 from the format it is stored in (e.g., AAC) to a format that is understood by networked media station 100 (e.g., the Apple Lossless encoder). This transcoding step is not necessarily required if the file is stored on personal computer 205 in a format that is understood by the networked media station. In any case, a block for transmission 1104 is created and encrypted in step 1105 to result in a transmitted block 1106. Again, this encryption step is not necessarily required, but is advantageous for digital rights management purposes. Each of these steps (transcoding and encryption) is preferably performed on personal computer 205.

Once the transmitted block is transmitted across wireless network 206 to networked media station 100 (transmission is step 1107), the decoding process begins. In step 1113, the received block 1106 (identical to transmitted block 1106) is decrypted, resulting in decrypted block 1104 (identical to block for transmission 1104). In step 1109, this data block is processed to decode the encoding performed in step 1103, resulting in raw audio block 1108, which may be, for example, in the form of PCM data. This data block is converted to an analog audio signal by a digital to audio converter (DAC) and output through stereo receiver 300 to loudspeakers 1112.

It should be noted that various buffering, error checking, and other data transfer steps implicit in various forms of networking have been omitted from the foregoing description. Nonetheless, these steps are preferably present and may be implemented in accordance with a variety of techniques known to those skilled in the art and/or disclosed herein. It also bears mentioning that certain steps may be omitted, for example, transcoding step 1103 is not required if media file 1101 is encoded in a format that can be decoded directly by networked media station 100. Additionally, in addition to the streaming mode of operation described above, sufficient storage could be provided on the networked media station 100 to allow media content to be stored thereon, either transferred from the original source or obtained from an independent source.

While the invention has been disclosed with respect to a limited number of embodiments, numerous modifications and variations will be appreciated by those skilled in the art. For example, for this disclosure, the term "computer" does not necessarily mean any particular kind of device, combination of hardware and/or software, nor should it be considered restricted to either a multi purpose or single purpose device. Additionally, although the invention has been described particularly with respect to the output or distribution of multimedia information, it should be understood that the inventive concepts disclosed herein are also generally applicable to the input or collection of such information. It is intended that all such variations and modifications fall with in the scope of the following claims.

What is claimed is:

1. A method, comprising:
   in a computer, performing operations for:
   receiving, through a wireless local area network, an advertisement identifying a networked media station on the wireless local area network and including connection information for the networked media station;
   using the connection information to establish a connection with the networked media station through the wireless local area network; and
   sending multimedia content to the networked media station through the connection, the multimedia content being configured to, when processed by the networked media station, cause the networked media station to output corresponding multimedia, the sending comprising:
   causing multimedia data from the multimedia content to be decoded to generate decoded multimedia data;
   causing the decoded multimedia data to be re-encoded to generate re-encoded multimedia data; and
   causing the re-encoded multimedia data to be sent to the networked media station.

2. The method of claim 1, further comprising:
   in the computer, performing operations for:
   acquiring, from the networked media station, information describing one or more multimedia capabilities of the networked media station.

3. The method of claim 1, further comprising:
   in the computer, performing operations for:
   verifying that the networked media station is authorized to receive the multimedia content.

4. The method of claim 1, further comprising:
   in the computer, performing operations for:
   encrypting at least one of the decoded multimedia data and the re-encoded multimedia data.

5. The method of claim 1, wherein identifying the networked media station that is communicatively coupled to the computer comprises:

in the computer, performing operations for:
identifying two or more networked media stations that are communicatively coupled to the computer, the two or more networked media stations comprising the networked media station;
presenting, in a user interface displayed by the computing device, an identification of the two or more networked media stations; and
receiving a selection of the networked media station.

6. The method of claim 1, further comprising:
in the computer, performing operations for:
detecting the networked media station using one or more discovery protocols by detecting, in accordance with the discovery protocols, the advertisement advertising at least one of an availability of the networked media station and one or more multimedia capabilities of the networked media station.

7. The method of claim 1, wherein the wireless network is provided by the networked media station.

8. The method of claim 1, wherein the operations of causing the multimedia data from the multimedia content to be decoded generate the decoded multimedia data and causing the decoded multimedia data to be re-encoded to generate the re-encoded multimedia data are performed during a transcoding of the multimedia data from a first format to a second format;
wherein the first format is different than the second format; and
wherein the second format is supported by the networked media station and the first format is not supported by the networked media station.

9. The method of claim 1, further comprising:
in the computer, performing operations for:
receiving, from the networked media station, data relating to the processing of the multimedia content by the networked media station; and
presenting, in a user interface displayed by the computing device, information based on the data relating to the processing of the multimedia content.

10. The method of claim 1, wherein the wireless local area network comprises a WiFi network.

11. The method of claim 1, wherein the connection is a direct peer to peer connection.

12. The method of claim 1, wherein the connection information comprises one or more of the availability of a service, a name of the networked media station providing the service, a wireless local area network address of the networked media station, and one or more configuration parameters related to the service.

13. A non-transitory computer-readable storage medium storing instructions that, when executed by a computer, cause the computer to perform a method comprising:
receiving, through a wireless local area network, an advertisement identifying a networked media station on the wireless local area network and including connection information for the networked media station;
using the connection information to establish a connection with the networked media station through the wireless local area network; and
sending multimedia content to the networked media station through the connection, the multimedia content being configured to, when processed by the networked media station, cause the networked media station to output corresponding multimedia, the sending comprising:
causing multimedia data from the multimedia content to be decoded to generate decoded multimedia data;
causing the decoded multimedia data to be re-encoded to generate re-encoded multimedia data; and
causing the re-encoded multimedia data to be sent to the networked media station.

14. The computer-readable storage medium of claim 13, wherein identifying the networked media station that is communicatively coupled to the computer comprises:
identifying two or more networked media stations that are communicatively coupled to the computer, the two or more networked media stations comprising the networked media station;
presenting, in a user interface displayed by the computing device, an identification of the two or more networked media stations; and
receiving a selection of the networked media station.

15. The computer-readable storage medium of claim 13, wherein the method further comprises:
detecting the networked media station using one or more discovery protocols by detecting, in accordance with the discovery protocols, the advertisement advertising at least one of the availability of the networked media station and one or more multimedia capabilities of the networked media station.

16. The computer-readable storage medium of claim 13, wherein the operations of causing the multimedia data from the multimedia content to be decoded generate the decoded multimedia data and causing the decoded multimedia data to be re-encoded to generate the re-encoded multimedia data are performed during a transcoding of the multimedia data from a first format to a second format;
wherein the first format is different than the second format; and
wherein the second format is supported by the networked media station and the first format is not supported by the networked media station.

17. The computer-readable storage medium of claim 13, wherein the method further comprises:
receiving, from the networked media station, data relating to the processing of the multimedia content by the networked media station; and
presenting, in a user interface displayed by the computing device, information based on the data relating to the processing of the multimedia content.

18. The computer-readable storage medium of claim 13, wherein the wireless local area network comprises a WiFi network.

19. The computer-readable storage medium of claim 13, wherein the connection is a direct peer to peer connection.

20. The computer-readable storage medium of claim 13, wherein the connection information comprises one or more of the availability of a service, a name of the networked media station providing the service, a wireless local area network address of the networked media station, and one or more configuration parameters related to the service.

21. A computer, comprising:
a processing system;
a network interface; and
wherein the processing system and the network interface perform operations for:
receiving, through a wireless local area network, an advertisement identifying a networked media station on the wireless local area network and including connection information for the networked media station;
using the connection information to establish a connection with the networked media station through the wireless local area network; and sending multimedia content to the networked media station through the connection, the multimedia content being configured to, when processed by the networked media station, cause the networked media station to output corresponding multimedia, the sending comprising:

decoding multimedia data from the multimedia content to generate decoded multimedia data;

re-encoding the decoded multimedia data to generate re-encoded multimedia data; and sending the re-encoded multimedia data to the networked media station.

22. The computer of claim 21, wherein, when identifying the networked media station that is communicatively coupled to the computer, the processing system and the network interface perform operations for:

identifying two or more networked media stations that are communicatively coupled to the computer, the two or more networked media stations comprising the networked media station;

presenting, in a user interface displayed by the computing device, an identification of the two or more networked media stations; and receiving a selection of the networked media station.

23. The computer of claim 21, wherein the processing system and the network interface further perform operations for:

detecting the networked media station using one or more discovery protocols by detecting, in accordance with the discovery protocols, the advertisement advertising at least one of the availability of the networked media station and one or more multimedia capabilities of the networked media station.

24. The computer of claim 21, wherein the operations of causing the multimedia data from the multimedia content to be decoded generate the decoded multimedia data and causing the decoded multimedia data to be re-encoded to generate the re-encoded multimedia data are performed during a transcoding of the multimedia data from a first format to a second format; wherein the first format is different than the second format; and wherein the second format is supported by the networked media station and the first format is not supported by the networked media station.

25. The computer of claim 21, wherein the processing system and the network interface further perform operations for:

receiving, from the networked media station, data relating to the processing of the multimedia content by the networked media station; and presenting, in a user interface displayed by the computing device, information based on the data relating to the processing of the multimedia content.

26. The computer of claim 21, wherein the wireless local area network comprises a WiFi network.

27. The computer of claim 21, wherein the connection is a direct peer to peer connection.

28. The computer of claim 21, wherein the connection information comprises one or more of the availability of a service, a name of the networked media station providing the service, a wireless local area network address of the networked media station, and one or more configuration parameters related to the service.

* * * * *